US012094407B2

(12) United States Patent
Momose

(10) Patent No.: US 12,094,407 B2

(45) Date of Patent: Sep. 17, 2024

(54) ELECTRO-OPTICAL DEVICE, ELECTRONIC APPARATUS AND DRIVING METHOD

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/953,942

(22) Filed: Sep. 27, 2022

(65) Prior Publication Data

US 2023/0097462 A1 Mar. 30, 2023

(30) Foreign Application Priority Data

Sep. 28, 2021 (JP) ................................ 2021-157606

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0842* (2013.01); *G09G 2310/06* (2013.01); *G09G 2310/08* (2013.01); *G09G 2320/0257* (2013.01)

(58) Field of Classification Search
None
See application file for complete search history.

(56) References Cited

U.S. PATENT DOCUMENTS

2003/0179221 A1* 9/2003 Nitta .................... G09G 3/3648 345/690
2003/0214493 A1 11/2003 Akimoto et al.
2008/0018655 A1* 1/2008 Han ..................... G09G 3/3233 345/545
2008/0316152 A1 12/2008 Kimura et al.
2016/0358531 A1* 12/2016 Nakakita .............. G09G 3/2022
2017/0243544 A1 8/2017 Kimura et al.
2019/0235250 A1 8/2019 Miyasaka et al.

FOREIGN PATENT DOCUMENTS

JP 2001-100709 A 4/2001
JP 2003-330422 A 11/2003
JP 2004-062199 A 2/2004
JP 2008-281827 A 11/2008
JP 2017-203991 A 11/2017
JP 2019-132941 A 8/2019

* cited by examiner

*Primary Examiner* — Matthew Yeung
(74) *Attorney, Agent, or Firm* — Oliff PLC

(57) ABSTRACT

An electro-optical device includes digital scanning lines, a digital signal line, and pixel circuits. Each circuit is coupled to a digital scanning line included in the digital scanning lines, and the digital signal line. Each pixel circuit includes a light-emitting element and a digital driving circuit that performs digital driving in which, when the pixel circuit is selected by the digital scanning line, display data is written to selected pixel circuit from the digital signal line, and a drive current is supplied to the light-emitting element of selected pixel circuit in an on-period of a length corresponding to a gray scale value of the display data. A field being a period in which one image is formed includes an all-pixels-light-off period in which the pixel circuits turn off the light-emitting elements, and a digital driving period in which the digital driving circuit performs the digital driving after the all-pixels-light-off period.

16 Claims, 23 Drawing Sheets

ELECTRO-OPTICAL DEVICE, ELECTRONIC APPARATUS AND DRIVING METHOD

The present application is based on, and claims priority from JP Application Serial Number 2021-157606, filed Sep. 28, 2021, the disclosure of which is hereby incorporated by reference herein in its entirety.

BACKGROUND

1. Technical Field

The present disclosure relates to an electro-optical device, an electronic apparatus and a driving method.

2. Related Art

In each of JP 2019-132941 A and JP 2008-281827 A, a technique is disclosed in which, in a display device in which a light-emitting element is used for a pixel, by causing a pixel to emit light for a weighted time corresponding to each bit of display data, a gray scale is displayed as a time average. Further, in each of JP 2019-132941 A and JP 2008-281827 A, a technique is disclosed in which, while a plurality of scanning lines are selected from above in order one at a time, a first bit is written to a pixel coupled to each scanning line, next, similarly while the plurality of scanning lines are selected from above in order one at a time, a second bit is written to the pixel coupled to each scanning line, and the procedure is continued up to an MSB.

In the driving technique in each of JP 2019-132941 A and JP 2008-281827 A, timing of switching from a display of a previous frame to a display of the next frame is different for each scanning line. For example, when a first bit of display data of a second frame is written to a pixel coupled to a first scanning line, a pixel coupled to a second scanning line or later displays display data of a first frame before the second frame. In such driving in which images of different frames are displayed at the same time, there is a problem that moving image blurring occurs. For example, when a fast-moving moving image is displayed, or when a head is moved in a case of an AR display by a head-mounted display, moving image blurring may occur.

SUMMARY

An aspect of the present disclosure relates to an electro-optical device including a plurality of digital scanning lines, a digital signal line, and a plurality of pixel circuits that are each coupled to a digital scanning line included in the plurality of digital scanning lines, and the digital signal line, wherein each of the pixel circuits includes a light-emitting element, and a digital driving circuit that performs digital driving, the digital driving in which, when the pixel circuit is selected by the digital scanning line, display data is written to selected pixel circuit from the digital signal line, and a drive current is supplied to the light-emitting element of selected pixel circuit in an on-period of a length corresponding to a gray scale value of the display data, and a field that is a period in which one image is formed includes an all-pixels-light-off period in which the plurality of pixel circuits turn off the light-emitting elements, and a digital driving period in which the digital driving circuit performs the digital driving after the all-pixels-light-off period.

Another aspect of the present disclosure relates to an electronic apparatus including the above electro-optical device.

Still another aspect of the present disclosure relates to a driving method for driving an electro-optical device including a plurality of digital scanning lines, a digital signal line, and a plurality of pixel circuits, the driving method including, turning off a light-emitting element included in each pixel circuit of the plurality of pixel circuits in an all-pixels-light-off period included in a field that is a period in which one image is formed, performing digital driving by each of the pixel circuits in a digital driving period that is included in the field and is after the all-pixels-light-off period, and supplying, in the digital driving, by each of the pixel circuits to which display data is written from the digital signal line when selected by the digital scanning line, a drive current to the light-emitting element in an on-period of a length corresponding to a gray scale value of the display data.

DESCRIPTION OF EXEMPLARY EMBODIMENTS

Preferred exemplary embodiments of the present disclosure will be described in detail hereinafter. Note that the exemplary embodiments described hereinafter are not intended to unjustly limit the content as set forth in the claims, and all of the configurations described in the exemplary embodiments are not always required constituent elements.

1. About Driving Technique of Display Device

Figure 1:
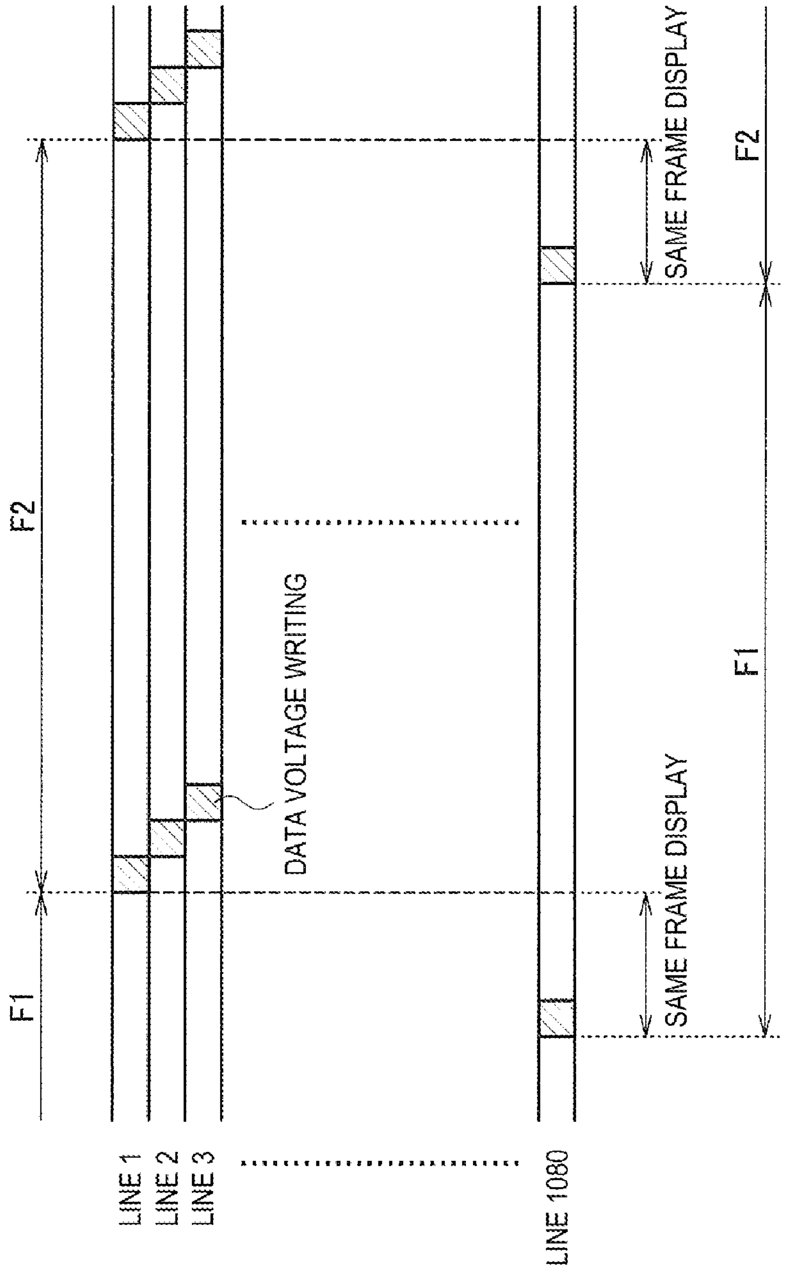
FIG. 1 is an example of a driving technique in an existing display device.

FIG. 1 illustrates a driving technique in a liquid crystal display device as an example of a driving technique in an existing display device. Here, an example is illustrated in which a panel in compliance with full hi-vision standards is driven. In FIG. 1, lines 1 to 1080 indicate scanning lines.

In the driving technique of the liquid crystal display device, a scanning line driver selects the line 1, and a data line driver writes a data voltage to a pixel in the line 1. In FIG. 1, a hatched portion indicates the data voltage writing. Next, the scanning line driver selects the line 2, and the data line driver writes a data voltage to a pixel in the line 2. The writing is repeated up to the line 1080 within one horizontal scanning period, and the lines 1 to 1080 are similarly driven in the next horizontal scanning period.

In this way, since the data line driver writes the data voltage sequentially to the lines 1 to 1080, when a display of a frame F2 is started in the line 1, a frame F1 before the frame F2 is displayed in the lines 2 to 1080. When the display of the frame F2 in the line 1080 is started, the next horizontal scanning period immediately follows, and a display of a frame F3 in the line 1 is started. Thus, it is only a slight period of time within the horizontal scanning period in which the same frame F2 is displayed in all the lines 1 to 1080.

For example, when there is a fast moving display target in a moving image, a display position of the display target is different in the frames F1 and F2. Thus, in a period where the display of the frame F1 and the display of the frame F2 are mixed, the display target blurred is displayed. In such a driving technique in which the frames are mixed and displayed, there is a problem that moving image blurring occurs when a fast-moving moving image or the like is displayed.

Further, when a display is turned on only during a period in which the same frame is displayed in order to reduce the moving image blurring, it is difficult to secure display brightness because the period is short.

In addition, in the driving technique of the liquid crystal display device, the data voltage, which is an analog voltage, is written to the pixel, and thus a sufficient writing time is required to display an accurate gray scale. Therefore, it is difficult to reduce the writing time per line, and it is difficult to ensure a period for displaying the same frame.

In addition, in each of the above JP 2019-132941 A and JP 2008-281827 A, digital driving is performed. In the digital driving, since display data is written into a pixel one bit at a time, a bit "0" or "1" is to be written to the pixel. However, in each of the above JP 2019-132941 A and JP 2008-281827 A, while a plurality of scanning lines are selected one line at a time in order from above, and a bit is written to a pixel coupled to each scanning line. That is, when a first bit of a second frame is written to a first scanning line, a display of a first frame is performed in a second scanning line and subsequent scanning lines, and the frames are displayed in a mixed manner. Therefore, a moving image blurring may occur in the same manner as the driving technique of the liquid crystal display device.

2. First Configuration Example of Electro-optical Device and Display System

Figure 2:
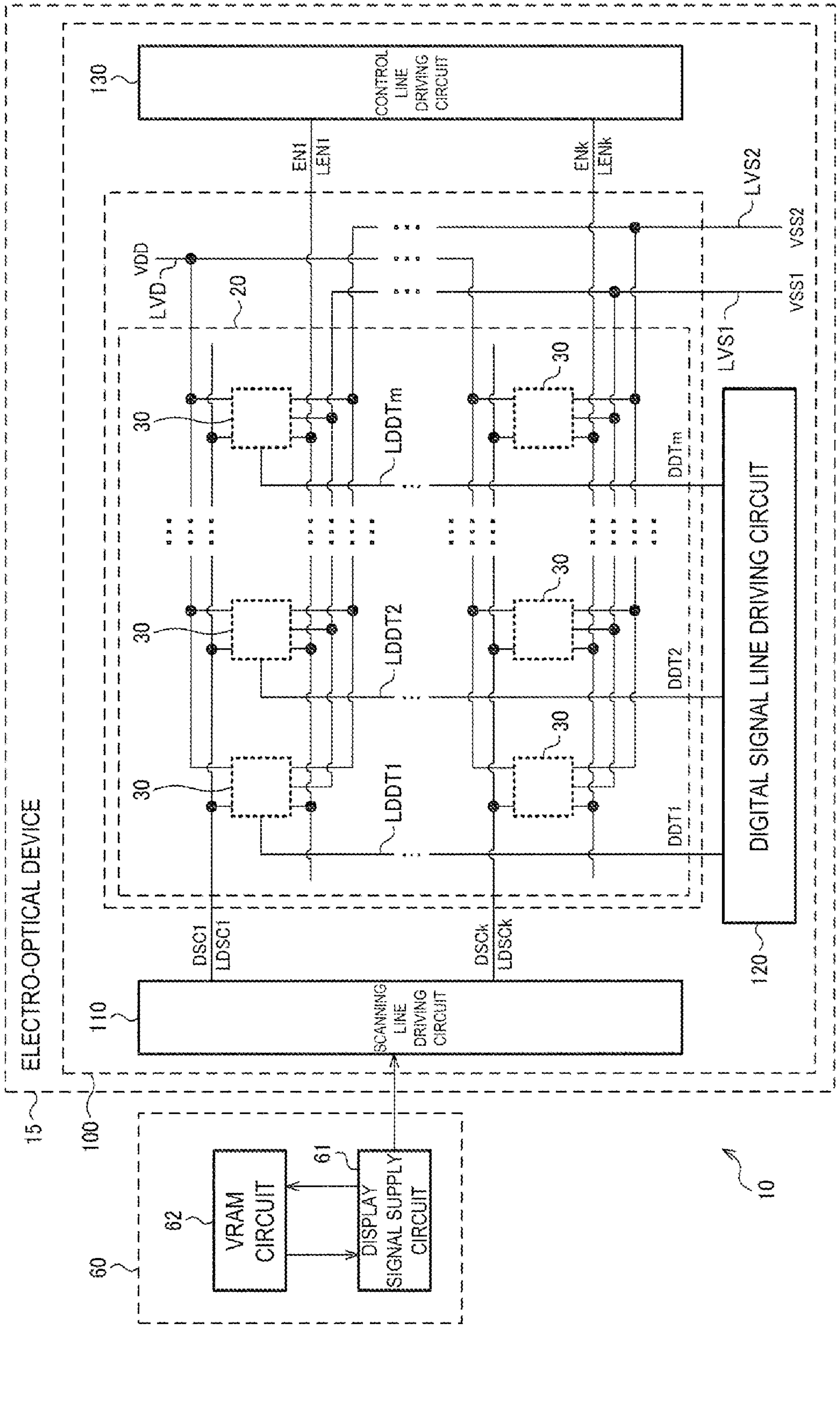
FIG. 2 is a first configuration example of an electro-optical device and a display system.

FIG. 2 is a first configuration example of an electro-optical device 15 and a display system 10 in the present exemplary embodiment. The display system 10 includes a display controller 60 and the electro-optical device 15. The electro-optical device 15 includes a circuit device 100 and pixel array 20.

The display controller 60 performs output of display data and display timing control for the circuit device 100. The display controller 60 includes a display signal supply circuit 61 and a VRAM circuit 62.

The VRAM circuit 62 stores display data displayed on the pixel array 20. For example, when storing image data for one image, the VRAM circuit 62 stores display data one piece at a time corresponding to each pixel in the pixel array 20.

The display signal supply circuit 61 generates a control signal for controlling display timing. The control signal is, for example, a vertical synchronization signal, a horizontal synchronization signal, a clock signal, or the like. The display signal supply circuit 61 reads out display data from the VRAM circuit 62 according to the display timing, and outputs the display data and the control signal to the circuit device 100.

The electro-optical device 15 is a self-light-emitting display device including a light-emitting element, and is, for example, an organic EL display device or a micro LED display device. The electro-optic device 15 is also referred to as an electro-optic element, a display element, an electro-optic panel, a display panel, an electro-optical device, or a display device. The electro-optical device 15 includes a semiconductor substrate (not illustrated), and the pixel array 20 and the circuit device 100 are formed at the semiconductor substrate. Note that, the pixel array 20 may be formed at a glass substrate, and the circuit device 100 may be configured by an integrated circuit device.

The circuit device 100 drives the pixel array 20 based on the display data and the control signal from the display controller 60, and causes the pixel array 20 to display an image. The circuit device 100 includes a scanning line driving circuit 110, a digital signal line driving circuit 120 and a control line driving circuit 130.

The pixel array 20 includes a plurality of pixel circuits 30 disposed in a matrix of k rows by m columns. k and m are integers equal to or greater than 2. Further, the pixel array 20 includes digital scanning lines LDSC1 to LDSCk, enable signal lines LEN1 to LENk, digital signal lines LDDT1 to LDDTm, a power supply line LVD, ground lines LVS1 and LVS2.

The digital scanning line LDSC1 and the enable signal line LEN1 are coupled to the pixel circuit 30 in a first row. The scanning line driving circuit 110 outputs a digital selection signal DSC1 to the digital scanning line LDSC1. The control line driving circuit 130 outputs an enable signal EN1 to the enable signal line LEN1. Similarly, digital scanning lines LDSC2 to LDSCk and the enable signal lines LEN2 to LENk are coupled to the pixel circuits 30 in second to k-th rows, respectively. The scanning line driving circuit 110 outputs digital selection signals DSC2 to DSCk to the digital scanning lines LDSC2 to LDSCk, respectively. The control line driving circuit 130 outputs enable signals EN2 to ENk to the enable signal lines LEN2 to LENk, respectively.

The digital signal line LDDT1 is coupled to the pixel circuit 30 in a first column. The digital signal line driving circuit 120 outputs a digital data signal DDT1 to the digital signal line LDDT1. The digital data signal DDT1 is a signal for one bit of n bits of display data. n is an integer equal to or greater than 2. Similarly, the digital signal lines LDDT2 to LDDTm are coupled to the pixel circuits 30 in second to m-th columns, respectively. The digital signal line driving circuit 120 outputs digital data signals DDT2 to DDTm to the digital signal line LDDT2 to LDDTm, respectively.

The power supply line LVD, the ground lines LVS1 and LVS2 are coupled to all the pixel circuits 30. A power supply voltage VDD is supplied to the power supply line LVD from a power supply circuit (not illustrated). A first ground voltage VSS1 is supplied to the first ground line LVS1 from the power supply circuit (not illustrated), and a second ground voltage VSS2 is supplied to the second ground line LVS2 from the power supply circuit (not illustrated). Note that, the ground lines LVS1 and LVS2 may be a common single ground line.

Figure 3:
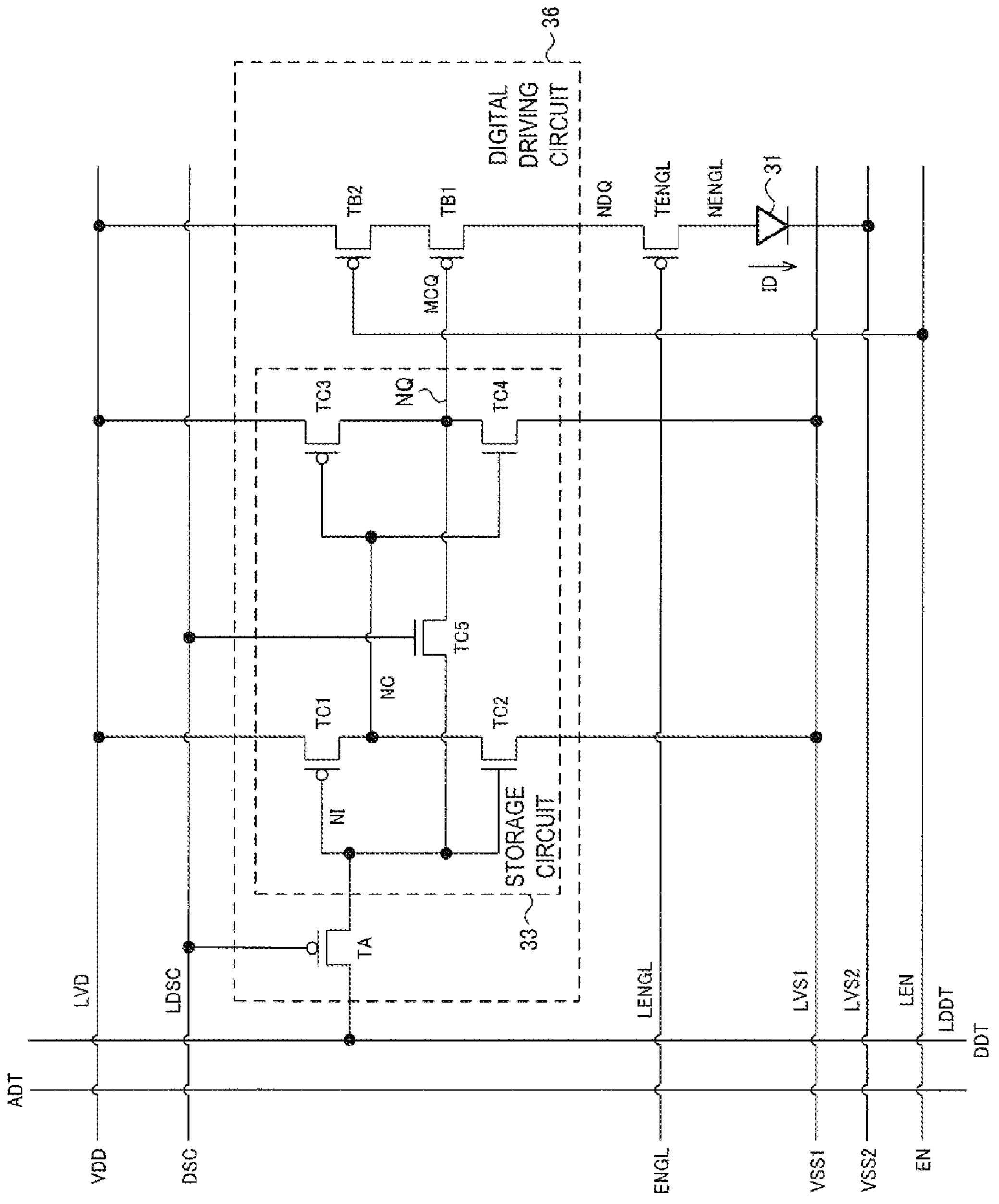
FIG. 3 is a first configuration example of a pixel circuit.

FIG. 3 is a first configuration example of the pixel circuit 30. The pixel circuit 30 includes a digital driving circuit 36, a light-emitting element 31, and a transistor TENGL. Note that, in FIG. 3, 1 to k, and 1 to m are omitted in DSC1 to DSCk, DDT1 to DDTm, and the like. For example, DSC is any one of DSC1 to DSCk.

The digital driving circuit 36 takes in the digital data signal DDT when the digital scanning line LDSC is selected, and stores the digital data signal DDT. The digital driving circuit 36 causes a drive current to flow from the power supply line LVD to a node NDQ when the digital data signal DDT is active, and blocks a drive current when the digital data signal DDT is inactive. Note that, in the following, it is assumed that active corresponds to a bit of "0" or a low level, and inactive corresponds to a bit of "1" or a high level.

The transistors TENGL is a P-type transistor. A source of the transistor TENGL is coupled to the node NDQ, a drain is coupled to a node NENGL, and a gate is coupled to a global enable signal line LENGL. Note that, the global enable signal line LENGL is not illustrated in FIG. 2, but is coupled to all the pixel circuits 30 in FIG. 2. The control line driving circuit 130 outputs a global enable signal ENGL to the global enable signal line LENGL. The transistor TENGL causes a drive current to flow from the node NDQ to the node NENGL when the global enable signal ENGL is enabled, and blocks a drive current when the global enable signal ENGL is disabled. Note that, in the following, it is assumed that enabled corresponds to the bit of "0" or the low level, and disabled corresponds to the bit of "1" or the high level.

The light-emitting element 31 is, for example, an OLED or a micro LED. OLED is an abbreviation for Organic Light Emitting Diode, and LED is an abbreviation for Light Emitting Diode. The micro LED is an inorganic LED integrated at a substrate. An anode of the light-emitting element 31 is coupled to the node NENGL, and a cathode is coupled to the second ground line LVS2. When the digital data signal DDT stored in the digital driving circuit 36 is "0", a drive current flows through the light-emitting element 31, and the light-emitting element 31 emits light at brightness corresponding to a current value of the drive current. When the digital data signal DDT stored in the digital driving circuit 36 is "1", the light-emitting element 31 is turned off. The above indicates a case where the transistor TENGL is on, and when the transistor TENGL is off, the light-emitting element 31 is turned off. Note that, in the following, a light-emitting state of the light-emitting element 31 is also referred to as "on", and a light-off state of the light-emitting element 31 is also referred to as "off".

Detailed configuration of the digital driving circuit 36 will be described. The digital driving circuit 36 includes a storage circuit 33, P-type transistors TA, TB1, and TB2.

One of a source and a drain of the P-type transistor TA is coupled to the digital signal line LDDT, another of the source and the drain is coupled to an input node NI of the storage circuit 33, and a gate is coupled to the digital scanning line LDSC.

A source of the P-type transistor TB2 is coupled to the power supply line LVD, a drain is coupled to a source of the P-type transistor TB1, and a gate is coupled to the enable signal line LEN. A drain of the P-type transistor TB1 is coupled to the node NDQ, and a gate is coupled to an output node NQ of the storage circuit 33. The P-type transistor TB1 is a drive transistor, is on or off based on an output signal MCQ from the storage circuit 33, and outputs a drive current to the node NDQ when on.

The storage circuit 33 is a memory cell that stores one bit of data. When the P-type transistor TA is on, the storage circuit 33 stores the digital data signal DDT input to the input node NI from the digital signal line LDDT, and outputs the stored signal as the output signal MCQ to the output node NQ. The storage circuit 33 includes P-type transistors TC1, TC3, N-type transistors TC2, TC4, and TC5.

The P-type transistor TC1 and the N-type transistor TC2 constitute a first inverter, and the P-type transistor TC3 and the N-type transistor TC4 constitute a second inverter. The power supply voltage VDD and the first ground voltage VSS1 are supplied to the first inverter and the second inverter. An input node of the first inverter is coupled to the input node NI of the storage circuit 33, an output node NC of the first inverter is coupled to an input node of the second inverter, and an output node of the second inverter is coupled to the output node NQ of the storage circuit 33. One of a source and a drain of the N-type transistor TC5 is coupled to the node NI, and another of the source and the drain is coupled to the output node NQ.

It is assumed that the transistor TENGL is on. When "0" is written to the storage circuit 33, the output signal MCQ is at the low level, and when "1" is written, the output signal MCQ is at the high level. When the output signal MCQ of the storage circuit 33 and the enable signal EN are at the low level, the P-type transistors TB1 and TB2 are on, and a drive current ID flows through the light-emitting element 31, and the light-emitting element 31 emits light. When at least one of the output signal MCQ of the storage circuit 33 and the enable signal EN is at the high level, at least one of the P-type transistors TB1 and TB2 is off, and the drive current ID does not flow through the light-emitting element 31, and the light-emitting element 31 does not emit light.

Note that, the configuration of the digital driving circuit 36 is not limited to that in FIG. 3. For example, a capacitor may be provided in place of the storage circuit 33, and the capacitor may hold the digital data signal DDT. Alternatively, the N-type transistor TC5 of the storage circuit 33 may be omitted, and the input node NI of the first inverter and the output node NQ of the second inverter may be directly coupled. Alternatively, the ground lines LVS1 and LVS2 may be a common ground line, and a ground voltage may be supplied to the light-emitting element 31 and the storage circuit 33 from the common ground line.

Figure 4:
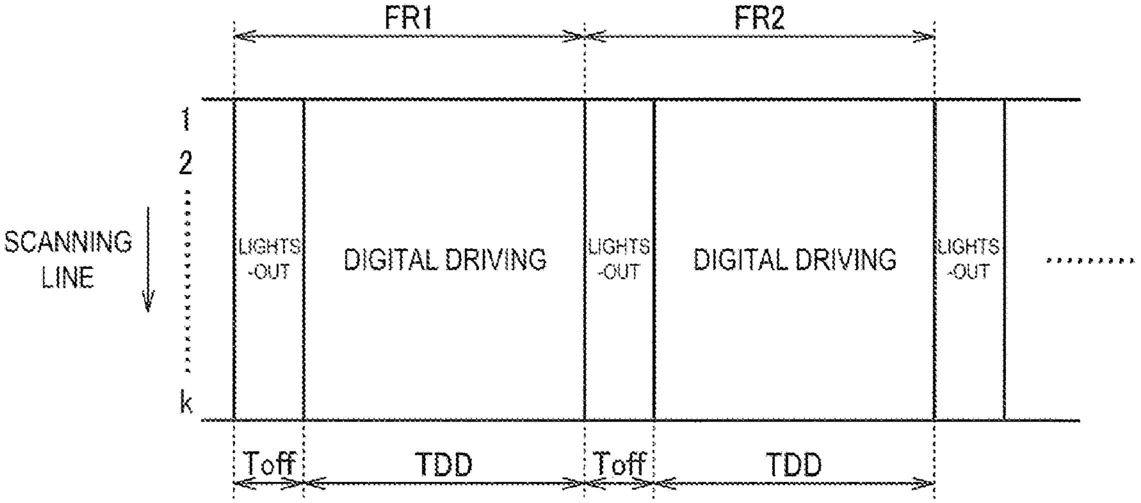
FIG. 4 is a diagram for explaining a driving technique of the electro-optical device.

FIG. 4 is a diagram for explaining a driving technique of the electro-optical device 15 in the present exemplary embodiment. FR1 is a first field, and FR2 is a second field following the first field FR1. Here, one frame is configured in one field. That is, the field is a period in which one image is formed, and specifically, is a period required to write display data corresponding to one image to all the pixels of the electro-optical device 15.

Each field is divided into an all-pixels-light-off period Toff and a following digital driving period TDD. That is, after the digital driving period TDD for the first field FR1 ends, the all-pixels-light-off period Toff for the second field FR2 is inserted, and subsequently, the digital driving period TDD is provided. The all-pixels-light-off period Toff is also referred to as a black insertion period, and the electro-optical device 15 turns off the light-emitting elements 31 of all of the pixels included in the pixel array 20. In the digital driving period TDD, digital driving is performed using display data of a field thereof. That is, the electro-optical device 15 displays an image for the first field FR1 in the first field FR1, and displays an image for the second field FR2 in the second field FR2. In one digital driving period TDD, an image for one field is displayed, and images for a plurality of fields are not mixed and displayed. Such driving is also referred to as field sequential driving. Note that, specific examples of the present driving technique will be described below in FIG. 5 and later.

In the above exemplary embodiment, the electro-optical device 15 includes the plurality of digital scanning lines LDSC1 to LDSCk, the digital signal line LDDT, and the plurality of pixel circuits 30. The digital signal line LDDT is one of LDDT1 to LDDTk. Each pixel circuit 30 is coupled to the digital scanning line LDSC included in the plurality of digital scanning lines LDSC1 to LDSCk, and the digital signal line LDDT. The digital scanning line LDSC is one of LDSC1 to LDSCk. Each pixel circuit 30 includes the light-emitting element 31 and the digital driving circuit 36. When the digital driving circuit 36 is selected by the digital scanning line LDSC, display data is written to the digital driving circuit 36 from the digital signal line LDDT, and the digital driving circuit 36 supplies the drive current ID to the light-emitting element 31 in an on-period of a length corresponding to a gray scale value of the display data. This is referred to as digital driving. A field that is a period in which one image is formed includes the all-pixels-light-off period Toff in which the plurality of pixel circuits 30 turn off the light-emitting elements 31, and the digital driving period TDD in which the digital driving circuit 36 performs the digital driving after the all-pixels-light-off period Toff.

Specifically, the field FR is divided into the all-pixels-light-off period Toff, and the digital driving period TDD after the all-pixels-light-off period Toff. Specifically, the field FR includes the all-pixels-light-off period Toff and the digital driving period TDD, but may include other periods.

According to the present exemplary embodiment, an image is displayed in the electro-optical device 15 in the digital driving period TDD, and the all-pixels-light-off period Toff is inserted between the digital driving period TDD and the next digital driving period TDD. In this way, an image display in a certain field and an image display in the next field are separated by the all-pixels-light-off period Toff, and thus moving image blurring is reduced compared to the existing driving technique described in FIG. 1. Further, a field is a period in which one image is formed, and the one image in the field is displayed in the digital driving period TDD. Thus, images for different fields are not mixed, and images for individual fields are temporally separated and displayed, so that moving image blurring is reduced compared to the existing driving technique described in FIG. 1.

In the present exemplary embodiment, the plurality of pixel circuits 30 perform the digital driving based on display data of an image displayed in the first field FR1 in the digital driving period TDD of the first field FR1. Each of the plurality of pixel circuits 30 performs the digital driving based on display data of an image displayed in the second field FR2 in the digital driving period TDD of the second field FR2.

According to the present exemplary embodiment, the digital driving in each field is performed based on display data of an image displayed in each field. Thus, images for respective fields are not mixed, and the image is displayed in a digital driving period for each field, so that the moving image blurring is reduced compared to the existing driving technique described with FIG. 1.

3. First Example of Driving Technique

Figure 5:
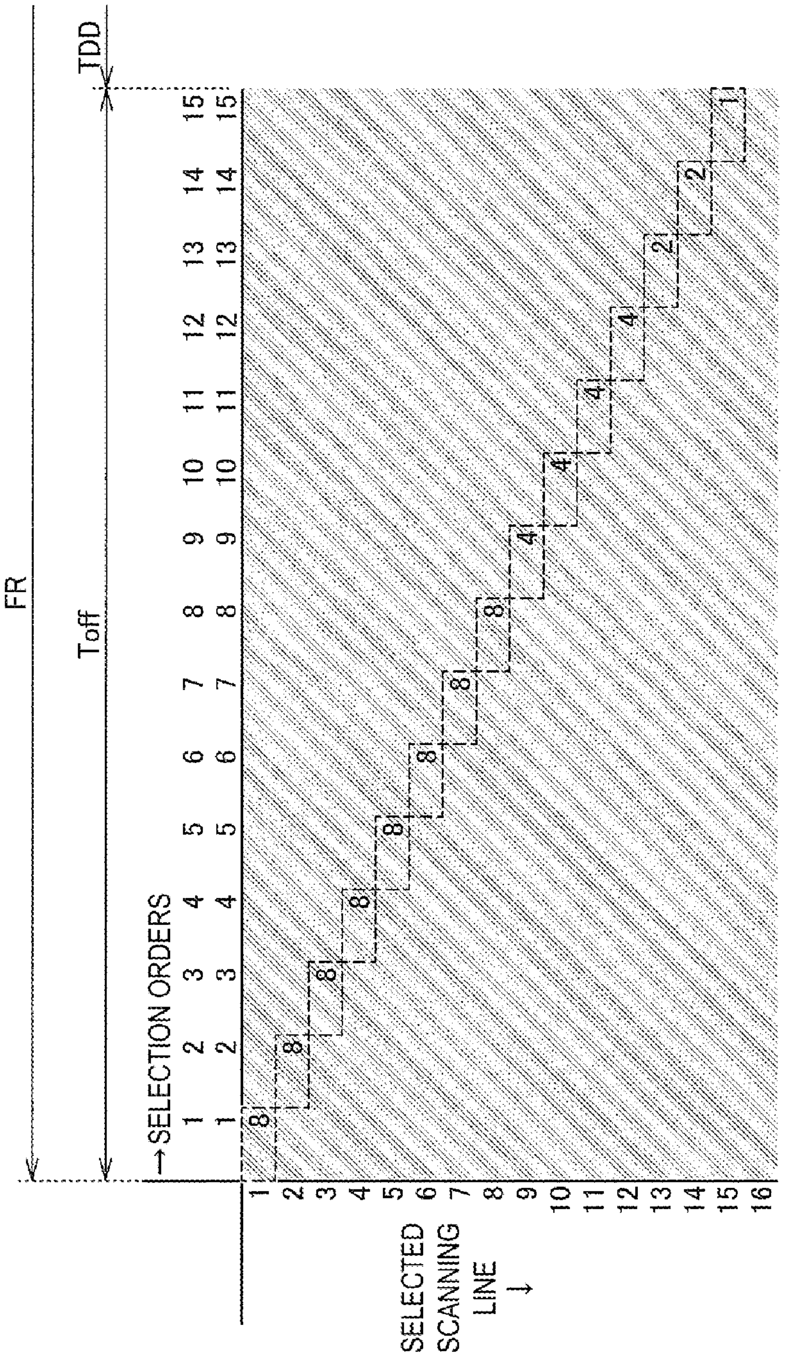
FIG. 5 is a first example of the driving technique.
Figure 6:
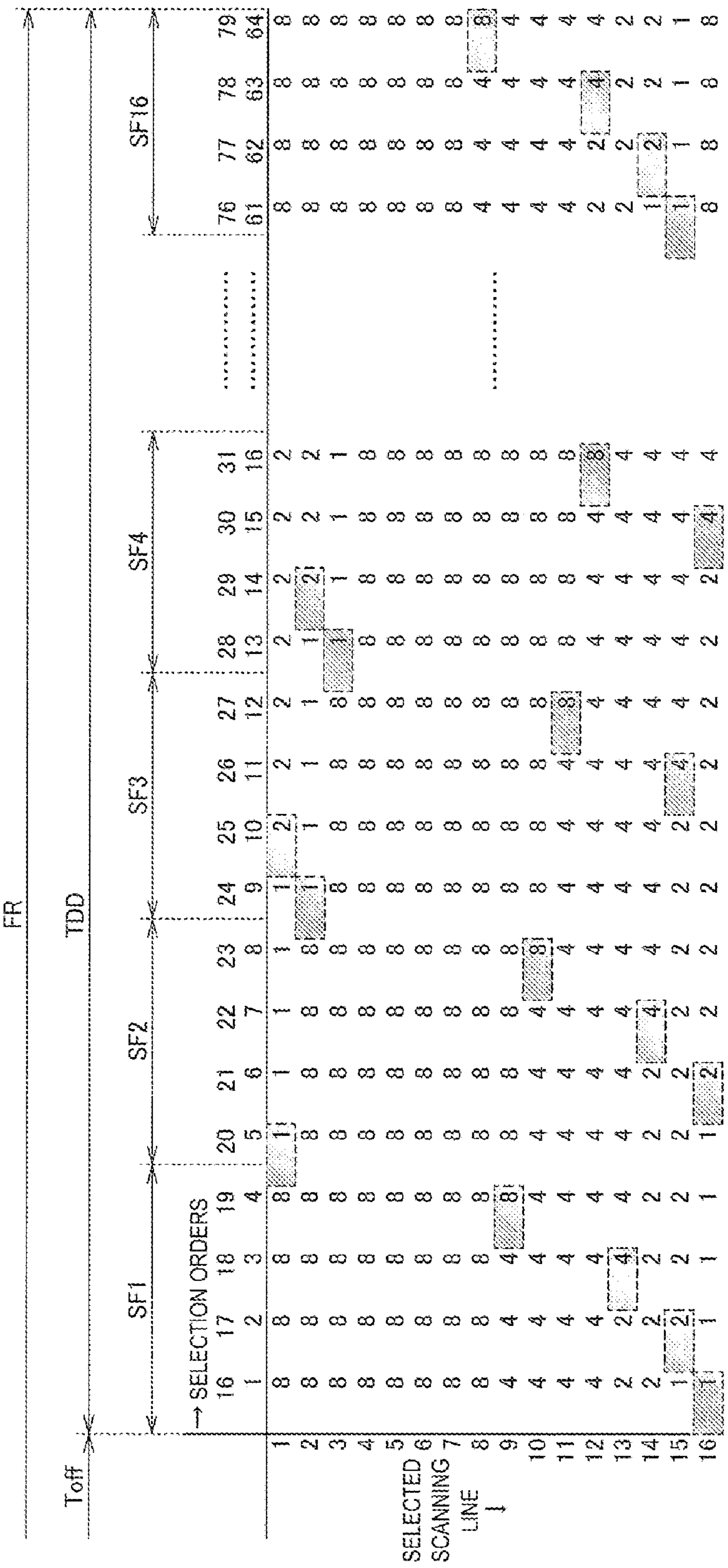
FIG. 6 is the first example of the driving technique.

FIG. 5 and FIG. 6 illustrate a first example of the driving technique in the present exemplary embodiment. Here, description will be given using a case as an example in which the total number of scanning lines included in the pixel array 20 is k=16, and the number of bits of display data is n=4. First to fourth bits are counted from an LSB side of the display data. Note that, simple expression of "first to 16th scanning lines" refers to pixel circuits in respective first to 16th rows in the pixel array. Then, the digital scanning lines coupled to the pixel circuits in the first to 16th lines are referred to first to 16th digital scanning lines, respectively.

In each of FIG. 5 and FIG. 6, a horizontal axis of a table indicates selection orders, and one selection order corresponds to a selection of one digital scanning line. That is, one selection order corresponds to one single horizontal scanning period. FIG. 5 and FIG. 6 each illustrate selection orders in two lines, a first line illustrates selection orders through the field FR, and a second line illustrates selection orders in the periods of the all-pixels-light-off period Toff and the digital driving period TDD. In the following, a length of one horizontal scanning period corresponding to one selection order is also denoted to as 1 h. A vertical axis of the table indicates numbers of respective scanning lines, and the scanning lines are numbered from 1 to 16 in a vertical scanning direction.

Also, a numeral written in each cell in the table indicates a gray scale value of each bit of display data. That is, 1, 2, 4, and 8 mean a first bit, a second bit, a third bit, and a fourth bit, respectively. A cell surrounded by a dotted line means a scanning line selection period in the digital driving. That is, a numeral surrounded by a dotted line means that a bit corresponding to the numeral is written to a pixel circuit coupled to a selected digital scanning line. A cell that is not surrounded by a dotted line and is not hatched means a display period in the digital driving. Also, a hatched cell means, regardless of whether the cell is surrounded by a dotted line or is not surrounded by a dotted line, a period in which the light-emitting element 31 of a pixel is turned off.

FIG. 5 illustrates a driving technique in the all-pixels-light-off period Toff. A length of the all-pixels-light-off period Toff is (k−1)h, and in the first example, the length of the all-pixels-light-off period Toff is 15 h.

The control line driving circuit 130 disables the global enable signal ENGL in the all-pixels-light-off period Toff, thereby turning off all the pixels in the first to 16th scanning lines. Note that, the control line driving circuit 130 may disable the enable signals EN1 to EN16 in the all-pixels-light-off period Toff, to turn off all the pixels in the first to 16th scanning lines. In this case, the global enable signal line LENGL may be omitted. In the following, it is assumed that the global enable signal ENGL is used to turn off all the pixels.

In a selection order 1, the scanning line driving circuit 110 selects the first digital scanning line, and the digital signal line driving circuit 120 outputs a fourth bit of display data as each of the digital data signals DDT1 to DDTm. Accordingly, the fourth bit of the display data is written to the digital driving circuit 36 of the pixel in the first scanning line.

Similarly, the scanning line driving circuit 110 selects the second to 15th digital scanning lines in selection orders 2 to 15, respectively. The digital signal line driving circuit 120 outputs the fourth bit of the display data in each of the selection orders 2 to 8, a third bit of the display data in each of the selection orders 9 to 12, a second bit of the display data in each of the selection orders 13 and 14, and a first bit of the display data in the selection order 15, as each of the digital data signals DDT1 to DDTm. Accordingly, the fourth bit of the display data is written to the digital driving circuit 36 of the pixel in each of the second to eighth scanning lines, and the third bit of the display data is written to the digital driving circuit 36 of the pixel in each of the ninth to 12th scanning line, the second bit of the display data is written to the digital driving circuit 36 of the pixel in each of the 13th and 14th scanning lines, and the first bit of the display data is written to the digital driving circuit 36 of the pixel in the 15th scanning line.

As described with FIG. 4, one image is displayed for one field FR. The display data written to the digital driving circuit 36 during the all-pixels-light-off period Toff is display data of an image displayed in the field FR, and does not include display data for fields other than the field FR.

FIG. 6 illustrates a driving technique in the digital driving period TDD. A length of the digital driving period TDD in the first example is 64 h, and a length of the field FR is 15 h+64 h=79 h. These calculation techniques will be described later. Selection orders 1 to 64 in the digital driving period TDD correspond to selection orders 16 to 79 in the field FR. Hereinafter, description will be given using the selection orders in the digital driving period TDD.

First, operation when one scanning line is focused will be described using the first scanning line as an example. In the digital driving circuit 36 of the pixel in the first scanning line, the fourth bit of the display data is written in the all-pixels-light-off period Toff. In each of the selection orders 1 to 4, in the digital driving period TDD, the pixel circuit 30 turns on or off the light-emitting element 31 based on the fourth bit held by the digital driving circuit 36.

Next, in the selection order 5, the scanning line driving circuit 110 selects the first digital scanning line, and the digital signal line driving circuit 120 outputs the first bit of the display data. As a result, the first bit is written to the digital driving circuit 36. In each of the subsequent selection orders 6 to 9, the pixel circuit 30 turns on or off the light-emitting element 31 based on the first bit held in the digital driving circuit 36.

Similarly, in the selection orders 10, 19 and 36, the scanning line driving circuit 110 selects the first digital scanning line, and the digital signal line driving circuit 120 outputs the second bit, the third bit, and the fourth bit, respectively. In this way, the second bit, the third bit, and the fourth bit are written to the digital driving circuit 36 in the selection orders 10, 19 and 36, respectively. In each of the subsequent selection orders 11 to 18, 20 to 35, and 37 to 64, the pixel circuit 30 turns on or off the light-emitting element 31 based on the second bit, the third bit, and the fourth bit held in the digital driving circuit 36, respectively. Note that, the fourth bit written to the digital driving circuit 36 in the selection order 36 is the same as the fourth bit written to the digital driving circuit 36 in the selection order 1 in the all-pixels-light-off period Toff.

In the above, in the digital driving period TDD in one field, first to fourth scanning line selection periods and first to fourth display periods are provided corresponding to the first to fourth bits. In the first scanning line, the first to fourth scanning line selection periods are periods corresponding to the selection orders 5, 10, 19, and 36, respectively. The first to third display periods are periods corresponding to the selection orders 6 to 9, 11 to 18, and 20 to 35, respectively. The fourth display period is a period corresponding to the selection orders 1 to 4, and 37 to 64. Lengths of the first to fourth display periods are 4 h, 8 h, 16 h, and 32 h, respectively. Which selection order corresponds to a scanning line selection period and to a display period depends on each scanning line, but the first to fourth scanning line selection periods and the first to fourth display periods are similarly provided for each scanning line.

Next, operation when the 16 scanning lines are scanned will be described. The digital driving period TDD in the field FR includes sub-fields SF1 to SF16 corresponding to the number of scanning lines, which is 16. When a length of a scanning line selection period is defined as 1 h, a length of each sub-field is 4 h corresponding to the number of bits of display data, which is 4.

The scanning line driving circuit 110 selects a scanning line group to be selected from among the first to 16th digital scanning lines in each sub-field. In FIG. 6, the scanning line group includes the four digital scanning lines corresponding to the number of bits of the display data, which is 4. A first bit is written to the pixel circuit 30 coupled to one digital scanning line among the four digital scanning lines, a second bit is written to the pixel circuit 30 coupled to another digital scanning line, a third bit is then written to the pixel circuit 30 coupled to still another digital scanning line, and a fourth bit is written to the pixel circuit 30 coupled to yet another digital scanning line. For example, in the sub-field SF1, a scanning line group includes the 16th digital scanning line, the 15th digital scanning line, the 13th digital scanning line, and the ninth digital scanning line, and to the pixel circuits 30 coupled thereto, the first bit, the second bit, the third bit, and the fourth bit are written, respectively.

The four digital scanning lines belonging to the scanning line group are selected in different selection orders, respectively. In the sub-field SF1 in FIG. 6, the 16th digital scanning line, the 15th digital scanning line, the 13th digital scanning line, and the ninth digital scanning line belonging to the scanning line group are selected in the selection orders 1, 2, 3, and 4 in the digital driving period TDD, respectively.

In the next sub-field, a number of a digital scanning line belonging to a scanning line group increases by one. That is, the selection order pattern in the sub-field moves downward by one scanning line. This pattern movement is performed cyclically. That is, a selection order pattern of the 16th scanning line in one certain sub-field becomes a selection order pattern of the first scanning line in the next sub-field. For example, in the sub-field SF2, a scanning line group includes the first digital scanning line, the 16th digital scanning line, the 14th digital scanning line, and the tenth digital scanning line, and to the pixel circuits 30 coupled thereto, the first bit, the second bit, the third bit, and the fourth bit are written, respectively. This is a result of cyclically moving the selection order pattern in the sub-field SF1 downward by one scanning line.

In the sub-field SF1, the first to fourth bits are written to the 16th scanning line, the 15th scanning line, the 13th scanning line, and the ninth scanning line, respectively. Considering spacing between the scanning lines, the 15th scanning line is one line before the 16th scanning line, the 13th scanning line is two lines before the 15th scanning line, and the ninth scanning line is four lines before the 13th scanning line. In the next sub-field SF2, the first bit is written to the first scanning line, which is eight lines before the ninth scanning line. Accordingly, each of the first to fourth display periods has a length in proportion to a gray scale value.

Specifically, description will be given focusing a display period for the 16th scanning line. First, the second bit is written to the 15th scanning line in the selection order 2, but the selection order pattern moves to the 16th scanning line after one sub-field. The length of the sub-field is 4 h, and the first display period for the 16th scanning line starts from the selection order 2, thus a length of the first display period is 1×4 h. Next, the third bit is written to the 14th scanning line in the selection order 7, but the selection order pattern moves to the 16th scanning line after two sub-fields. The second display period for the 16th scanning line starts from the selection order 7, thus a length of the second display period is 2×4 h=8 h. Similarly, a length of the third display period is 4×4 h, and a length of the fourth display period is 8×4 h.

The total number of scanning lines is 16, and writing of four bits is required per scanning line, thus the total number of scanning line selections in the digital driving period TDD is 16×4=64. As described with FIG. 5, the length of the all-pixels-light-off period Toff is 15 h. Accordingly, the length of the field FR described with FIG. 5 and FIG. 6 is 15 h+64 h=79 h. In the following frames, the selection order pattern of the same 79 h as in FIG. 5 and FIG. 6 is repeated. Note that, an exact formula for the total number of scanning line selections will be described later.

In the first example described above, a ratio of the digital driving period TDD in the field FR is 64 h/79 h=0.81. Since the field sequential driving is performed, and the digital driving period TDD, which is a lighting period or a display period, can be sufficiently ensured, both a reduction in moving image blurring and a display at high brightness can be achieved.

Figure 7:
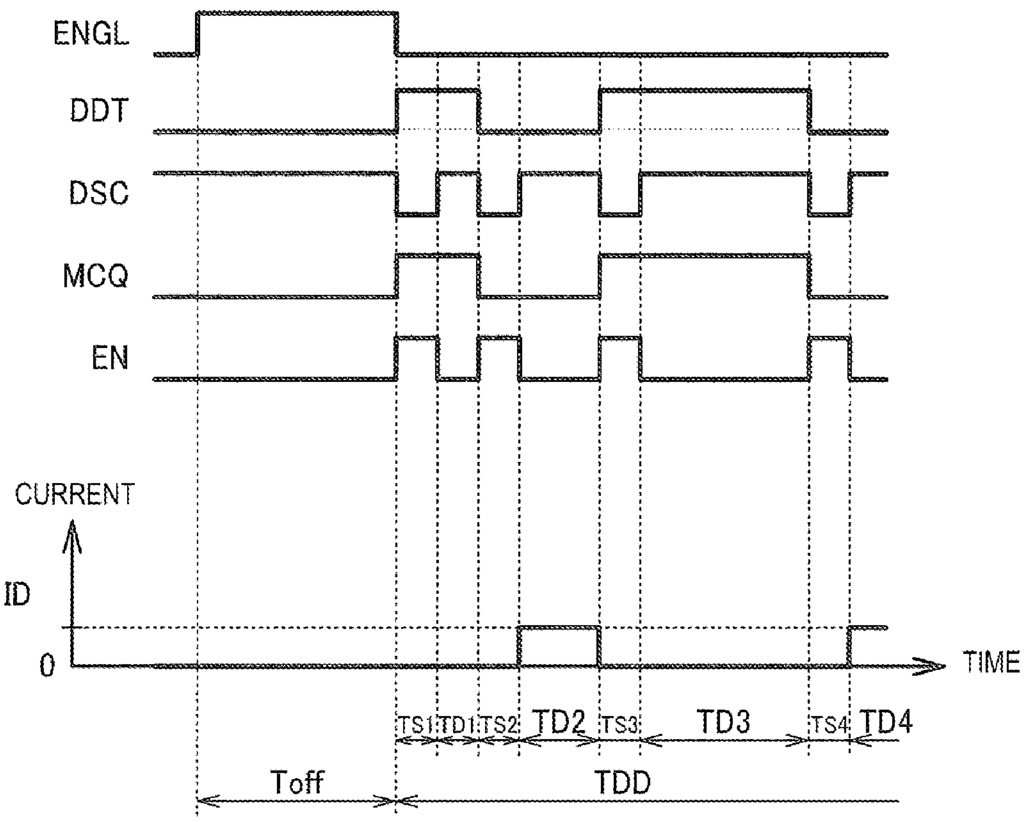
FIG. 7 is a signal waveform example in a first configuration example of the electro-optical device.
Figure 8:
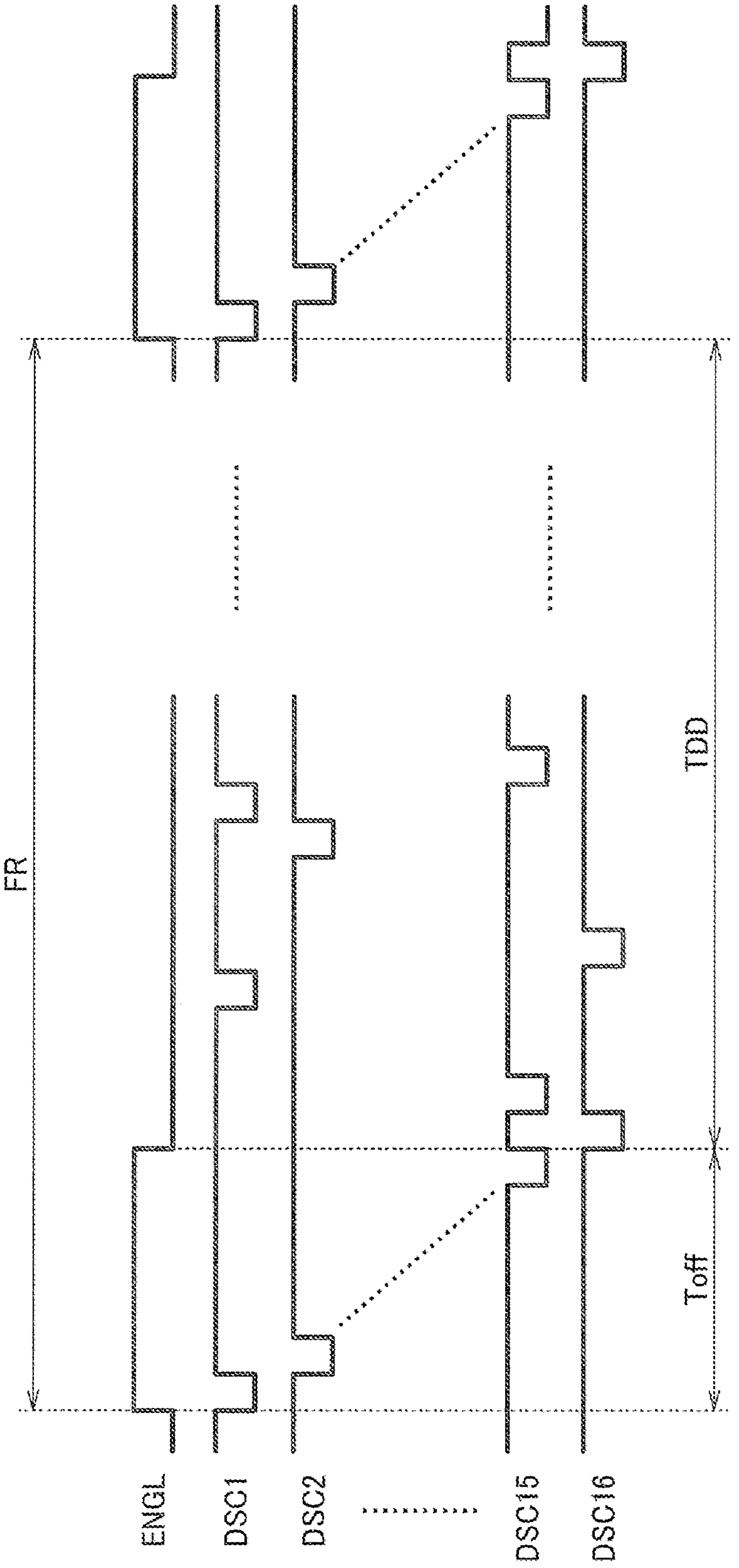
FIG. 8 is a signal waveform example in the first configuration example of the electro-optical device.

In each of FIG. 7 and FIG. 8. a signal waveform example in the first configuration example of the electro-optical device 15 is illustrated. Note that, an outline of a signal waveform is illustrated here, and a length of each period is not necessarily an actual length.

FIG. 7 illustrates a signal waveform example in the 16th scanning line of the first example of the driving technique. In the all-pixels-light-off period Toff, the control line driving circuit 130 outputs the disabled global enable signal ENGL. Accordingly, the transistor TENGL is off in all the pixel circuits 30, and the light-emitting element 31 is off. In the digital driving period TDD, the control line driving circuit 130 outputs the enabled global enable signal ENGL. Accordingly, the transistor TENGL is on in all the pixel circuits 30, and the digital driving is enabled.

In the digital driving period TDD, the digital driving circuit 36 performs the digital driving. Here, description will be given using a case as an example in which a first bit of display data is DDT[0]=1, a second bit is DDT[1]=0, a third bit is DDT[2]=1, and a fourth bit is DDT[3]=0.

In a scanning line selection period TS1, the digital selection signal DSC is at the low level. At this time, the P-type transistor TA of the digital driving circuit 36 is on, and the N-type transistor TC5 is off. In this way, the first bit DDT [0]=1 is input to the storage circuit 33, and the storage circuit 33 outputs the output signal MCQ at the high level. The enable signal EN is at the high level. As described above, since the P-type transistors TB1 and TB2 are off, the light-emitting element 31 is off.

In a display period TD1, the digital selection signal DSC is at the high level. At this time, the P-type transistor TA is off, and the N-type transistor TC5 is on. In this way, the storage circuit 33 holds the first bit DDT[0]=1, and holds the output signal MCQ at the high level. The enable signal EN is at the low level. As described above, the P-type transistor TB1 is off, and the P-type transistor TB2 is on, and thus the light-emitting element 31 is off.

Also in a scanning line selection period TS2 and a display period TD2, the pixel circuit 30 operates in the same manner as described above, but since DDT[1]=0, the light-emitting element 31 is on in the display period TD2, and a drive current flows through the light-emitting element 31. Similarly, since DDT[2]=1 and DDT[3]=0, the light-emitting element 31 is off in the display period TD3 and is on in the display period TD4, and a drive current flows through the light-emitting element 31 in the display period TD4.

A length of the display period TD2 is twice a length of the display period TD1. Similarly, a length of the display period TD3 is twice the length of the display period TD2, and a length of the display period TD4 is twice the length of the display period TD3. That is, the display periods TD1, TD2, TD3, and TD4 have the lengths proportional to the gray scale values 1, 2, 4, and 8 of the first, second, third, and fourth bits, respectively.

FIG. 8 illustrates a signal waveform example of the digital selection signals DSC1 to DSC 16 in the respective first to 16th scanning lines of the first example of the driving technique. Description will be given using selection orders in the digital driving period TDD.

The scanning line driving circuit 110 sets the digital selection signal DSC1 to the low level in a selection order 1. Accordingly, writing is performed to the digital driving circuit 36 of a pixel in the first scanning line. Likewise, the digital selection signals DSC2 to DSC16 are set to the low level in the selection orders 2 to 16, respectively. Accordingly, writing is performed to the digital driving circuit 36 of the pixel of each of the second to 16th scanning lines.

As described with FIG. 5 and FIG. 6, the selection orders 1 to 15 are in the all-pixels-light-off period Toff, and the selection order 16 is the first selection order in the digital driving period TDD. The selection order 16 to the selection order 79 correspond to the selection orders 1 to 64 in the digital driving period TDD, and the digital driving described with FIG. 6 is performed.

In the present exemplary embodiment described above, an i-th pixel circuit among the first to k-th pixel circuits, which are the plurality of pixel circuits 30, is coupled to an i-th digital scanning line LDSCi among the first to k-th digital scanning lines LDSC1 to LDSCk, which are the plurality of digital scanning lines. k is an integer equal to or greater than 2, and i is an integer from 1 to k. Each of the first to k-th pixel circuits is the pixel circuit 30 coupled to one digital signal line LDDT among the digital signal lines LDDT1 to LDDTm. In the all-pixels-light-off period Toff, the first to k−1-th digital scanning lines LDSC1 to LDSCk−1 are sequentially selected, and display data of an image displayed in the field FR is written to each of the first to k−1-th pixel circuits from the digital signal line LDDT. In the digital driving period TDD, each of the first to k−1-th pixel circuits performs the digital driving based on the display data written in the all-pixels-light-off period Toff.

In the first example of the driving technique, k=16. As described with FIG. 5, in the all-pixels-light-off period Toff, the first to 15th digital scanning lines LDSC1 to LDSC15 are sequentially selected, and the display data of the image displayed in the field FR is written to each of the first to 15th pixel circuits from the digital signal line LDDT. More specifically, among the first to fourth bits of the display data, a bit displayed in each of the first to 15th pixel circuits in the first scanning line selection period of the digital driving period TDD for the field FR is written to each of the first to 15th pixel circuits in the all-pixels-light-off period Toff. For example in FIG. 6, in the selection order 1 in the digital driving period TDD, the fourth bit is displayed in the pixel circuit in each of the first to eighth scanning lines, and the third bit is displayed in the pixel circuit in each of the ninth to 12th scanning line, and the second bit is displayed in the pixel circuit in each of the 13th and 14th scanning lines, and the first bit is displayed in the pixel circuit in the 15th scanning line. At this time, as illustrated in FIG. 5, in the all-pixels-light-off period Toff, the fourth bit is written to the pixel circuit in each of the first to eighth scanning lines, and the third bit is written into the pixel circuit in each of the ninth to 12th scanning lines, and the second bit is written to the pixel circuit in each of the 13th and 14th scanning lines, and the first bit is written to the pixel circuit in the 15th scanning line.

According to the present exemplary embodiment, in the all-pixels-light-off period Toff, the display data of the image displayed in the field FR can be written to the pixel circuit 30. Thus, in the digital driving period TDD for the field FR, the digital driving is performed based on the display data of the image displayed in the field FR. Thus, images for respective fields are not mixed, and the image is displayed in a digital driving period for each field, so that the moving image blurring is reduced compared to the existing driving technique described with FIG. 1.

In addition, in the present exemplary embodiment, the k-th digital scanning line is selected in the first scanning line selection period of the digital driving period TDD, and the display data of the image displayed in the field FR is written from the digital signal line LDDT to the k-th pixel circuit.

In the first example of the driving technique, k=16. Among the first to fourth bits of the display data, a bit displayed in the 16th pixel circuit in the second scanning line selection period of the digital driving period TDD is written to the 16th pixel circuit in the first scanning line selection period of the digital driving period TDD. For example, in FIG. 6, the first bit is displayed in the pixel circuit in the 16th scanning line in the selection order 2 in the digital driving period TDD. At this time, in the selection order 1 in the digital driving period TDD, the first bit is written to the pixel circuit in the 16th scanning line.

According to the present exemplary embodiment, the display data of the image displayed in the field FR is written to each of the first to k-th pixel circuits in the all-pixels-light-off period Toff and the first scanning line selection period of the digital driving period TDD. Thus, in the digital driving period TDD for the field FR, the digital driving is performed based on the display data of the image displayed in the field FR.

In addition, in the present exemplary embodiment, the digital driving period TDD for the field FR includes the plurality of sub-fields SF1 to SF16. In a sub-field included in the plurality of sub-fields SF1 to SF16, the scanning line driving circuit 110 selects, once, one scanning line group to be selected from among the plurality of digital scanning lines LDSC1 to LDSCk.

In the above described JP 2019-132941 A and JP 2008-281827 A, while a plurality of scanning lines are selected one line at a time in order from above, after a certain bit is written to a pixel coupled to each scanning line, until writing of the next bit is started, a period occurs in which no scanning line is selected. Since a length of one frame is determined by a frame rate, there is a problem that a scanning line driving frequency is increased because there is the period in which no scanning line is selected. According to the present exemplary embodiment, a scanning line group to be selected in each sub-field is selected. This makes it possible to reduce a non-scanning period in which no scanning line is selected, and a scanning line drive frequency can be decreased compared to the existing technique. When the scanning line drive frequency is decreased, it is possible to reduce power consumption in scanning line driving, or to write data to a pixel circuit reliably. Alternatively, assuming that the scanning line drive frequency is the same as that in the existing technique, it is possible to select more scanning lines in one frame. That is, a higher-definition electro-optical device can be driven without increasing the scanning line drive frequency compared to the existing technique.

In addition, in the present exemplary embodiment, the electro-optical device 15 includes the scanning line driving circuit 110 that drives the plurality of digital scanning lines LDSC1 to LDSCk. The digital driving period TDD includes first to n-th scanning line selection periods in which first to n-th bits of display data are written to the pixel circuit 30, and first to n-th display periods in which the light-emitting element 31 is on or off by the first to n-th bits written to the pixel circuit 30. The on-period is a display period in which the light-emitting element 31 is on among the first to n-th display periods.

In the first example of the driving technique, n=4, and TS1 to TS4 correspond to the first to fourth scanning line selection periods, respectively, and TD1 to TD4 correspond to the first to fourth display periods, respectively. Each of the second display period TD2 and the fourth display period TD4 in which the light-emitting element 31 is on is the on-period of a length corresponding to a gray scale value of the display data.

According to the present exemplary embodiment, in the digital driving period TDD, the light-emitting element 31 emits light in the on-period of the length corresponding to the gray scale value of the display data. Time-averaged emission brightness in one frame is determined by a ratio of the on-period to one frame, thus is brightness in proportion to a gray scale value based on maximum brightness.

In addition, in the present exemplary embodiment, a scanning line group includes a digital scanning line coupled to the pixel circuit 30 to which an i-th bit is written in a sub-field, and a digital scanning line coupled to the pixel circuit 30 to which a j-th bit is written in the sub-field. i is an integer from 1 to n, and j is an integer from 1 to n and different from i.

For example, when i=1 and j=2, in the sub-field SF1 in FIG. 6, the first bit is written to the 16th scanning line, and the second bit is written to the 15th scanning line. That is, in the sub-field SF1, the scanning line group includes the 16th scanning line and the 15th scanning line.

According to the present exemplary embodiment, the i-th bit is written to one scanning line in one sub-field, and the j-th bit is written to a different scanning line. This makes it possible to reduce a non-scanning period in which no scanning line is selected, and a scanning line drive frequency can be decreased compared to the existing technique.

Here, the plurality of sub-fields SF1 to SF16 are the sub-fields included in the digital driving period TDD for the field FR, and specifically, the plurality of sub-fields are obtained by dividing the digital driving period TDD for the field FR into a plurality of periods. Additionally, the plurality of digital scanning lines are digital scanning lines for forming a scanning line selection order pattern, and the number of digital scanning lines is not limited to the number of scanning lines actually present in the electro-optical device. In FIG. 6, the scanning line selection order pattern is formed by the 16 scanning lines. At this time, the number of the scanning lines actually present in the electro-optical device may be 16, or less than 16. For example, when the number of scanning lines actually present in the electro-optical device is 14, a selection order pattern for the first to 16th scanning lines is present as internal processing of the circuit device 100, but the 15th and 16th scanning lines are not actually driven. Furthermore, selecting a scanning line group once in a sub-field means selecting one digital scanning line belonging to the scanning line group once. At this time, one scanning line is selected in the same selection order, and two or more scanning lines are not selected simultaneously.

In addition, in the present exemplary embodiment, the plurality of sub-fields SF1 to SF16 are periods of the same length. In a sub-field, the scanning line driving circuit 110 selects, as a scanning line group, n digital scanning lines from a digital scanning line coupled to the pixel circuit 30 to which a first bit is written, to a digital scanning line coupled to the pixel circuit 30 to which an n-th bit is written.

For example, in the sub-field SF1 in FIG. 6, the first bit, the second bit, the third bit, and the fourth bit are written to the 16th scanning line, the 15th scanning line, the 13th scanning line, and the ninth scanning line, respectively. That is, in the sub-field SF1, the scanning line group includes the 16th scanning line, the 15th scanning line, the 13th scanning line, the ninth scanning line, that is, the four scanning lines.

The fact that each sub-field is the period of the same length is that the number of scanning lines in the scanning line group selected in each sub-field is the same. Then, the same number of scanning lines as that of bits of display data are shifted per sub-field and selected, and when one cycle is completed, the first to n-th bits are written to all the scanning lines in one frame. In FIG. 6, four scanning lines are selected in each sub-field, and the pattern is shifted for each sub-field by one line, and when one cycle is completed by the 16 sub-fields, the first to fourth bits are written to the 16 scanning lines in one frame.

4. Second Example to Fourth Example of Driving Technique

Figure 9:
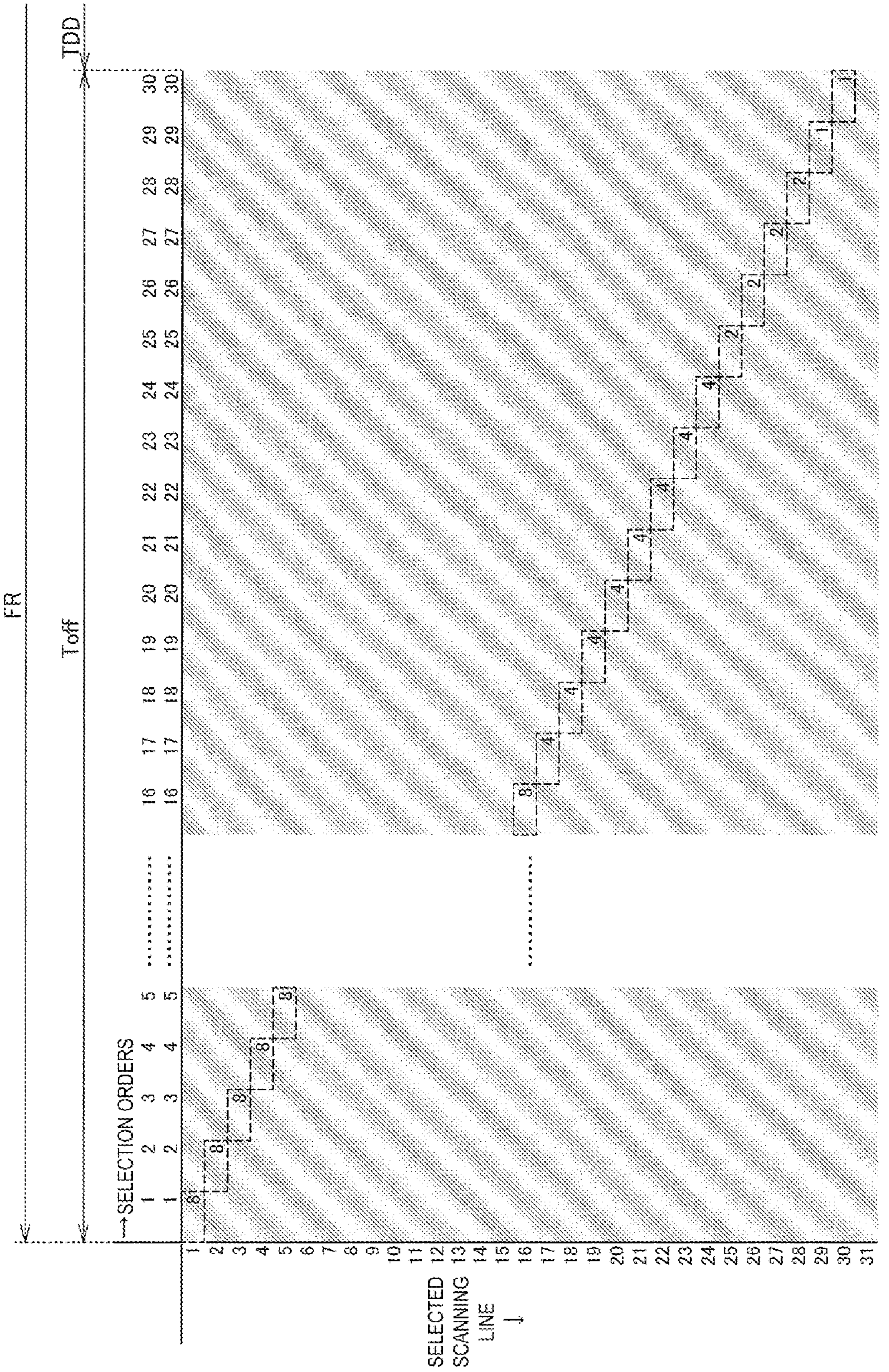
FIG. 9 is a second example of the driving technique.
Figure 10:
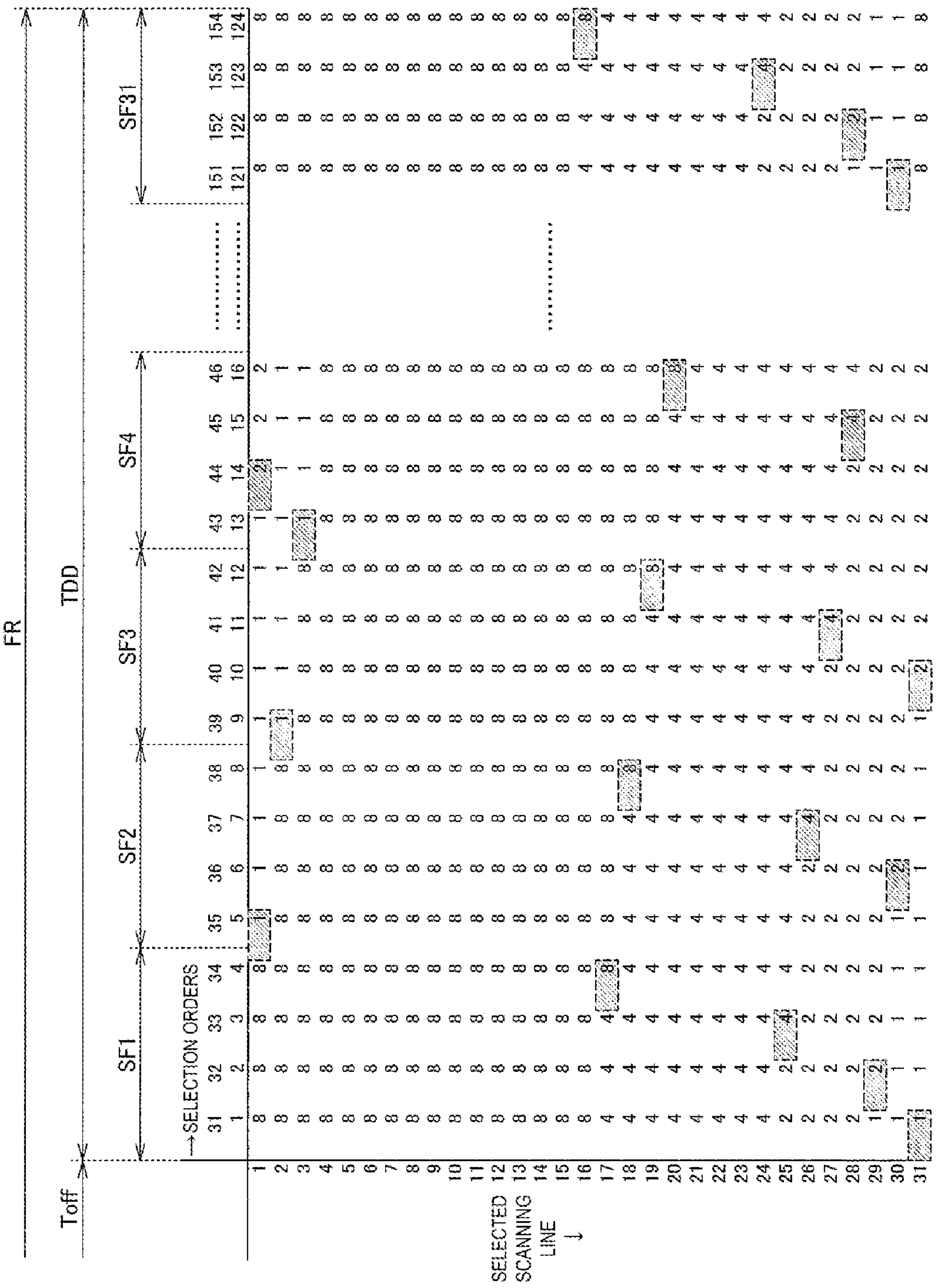
FIG. 10 is the second example of the driving technique.

FIG. 9 and FIG. 10 illustrate a second example of the driving technique in the present exemplary embodiment. Here, description will be given using a case as an example in which the total number of scanning lines included in the pixel array 20 is k=31, and the number of bits of display data is n=4.

FIG. 9 illustrates a driving technique in the all-pixels-light-off period Toff. In the second example, a length of the all-pixels-light-off period Toff is 30 h. The control line driving circuit 130 disables the global enable signal ENGL in the all-pixels-light-off period Toff, thereby turning off all pixels in first to 31st scanning lines.

In the second example, a fourth bit of display data is written to the digital driving circuit 36 of the pixel in each of the first to 16th scanning lines. A third bit of the display data is written to the digital driving circuit 36 of the pixel in each of the 17th to 24th scanning lines. A second bit of the display data is written to the digital driving circuit 36 of the pixel in each of the 25th to 28th scanning lines. A first bit of the display data is written to the digital driving circuit 36 of the pixel in each of the 29th and 30th scanning lines.

The display data written to the digital driving circuit 36 during the all-pixels-light-off period Toff is display data of an image displayed in the field FR, and does not include display data for fields other than the field FR.

FIG. 10 illustrates a driving technique in the digital driving period TDD. In the first example described above, the display period of the first bit is 4 h corresponding to one sub-field, but in the second example, is 2×4 h corresponding to two sub-fields.

In the second example, the number of scanning lines is 31, and the total number of scanning line selections in the digital driving period TDD is 31×4 bits=124. The number of sub-fields is the same as the number of scanning lines, which is 31. A length of the field FR is 30 h+124 h=154 h. Selection orders 1 to 124 in the digital driving period TDD correspond selection orders 31 to 154 in the field FR.

Hereinafter, a formula for determining the total number of scanning line selections Nfr in the field FR will be described. First, the total number of scanning line selections Ndd in the digital driving period TDD is determined.

A number obtained by dividing a length of a display period of a first bit by a length of a sub-field is defined as a multiple a. a is an integer equal to or greater than 1. In the first example, a=1, and in the second example, a=2. The number of bits of the display data is n. In the first example and the second example, n=4. At this time, the following Equation (1) holds.

$$Ndd=((2^n-1)\times a+1)\times n \tag{1}$$

Additionally, k, which is the number of the scanning lines, is obtained by the following Equation (2).

$$k=Ndd/n=(2^n-1)\times a+1 \tag{2}$$

Since the number of scanning line selections, in the all-pixels-light-off period Toff, is k−1, the total number of scanning line selections Nfr in the field FR is obtained by the following Equation (3).

$$Nfr=k-1+Ndd=k-1+((2^n-1)\times a+1)\times n \tag{3}$$

When n=4 and a=2 in the second example are applied, Ndd=$((2^4-1)\times2+1)\times4$=124, k=124/4=31, Nfr=31−1+124=154, and are consistent with FIG. 9 and FIG. 10. In addition, in the first example, n=4 and a=1, thus Ndd=$(2^4-1)\times1+1)\times4$=64, k=64/4=16, Nfr=16−1+64=79, and are consistent with FIG. 5 and FIG. 6.

In the second example described above, a ratio of the digital driving period TDD in the field FR is 124 h/154 h=0.81, and the digital driving period TDD, which is a lighting period or a display period, is sufficiently ensured. Additionally, in the above Equations (1) to (3), by adjusting the number of bits n of the display data and the multiple a, it is possible to support electro-optical devices having various numbers of scanning lines.

Figure 11:
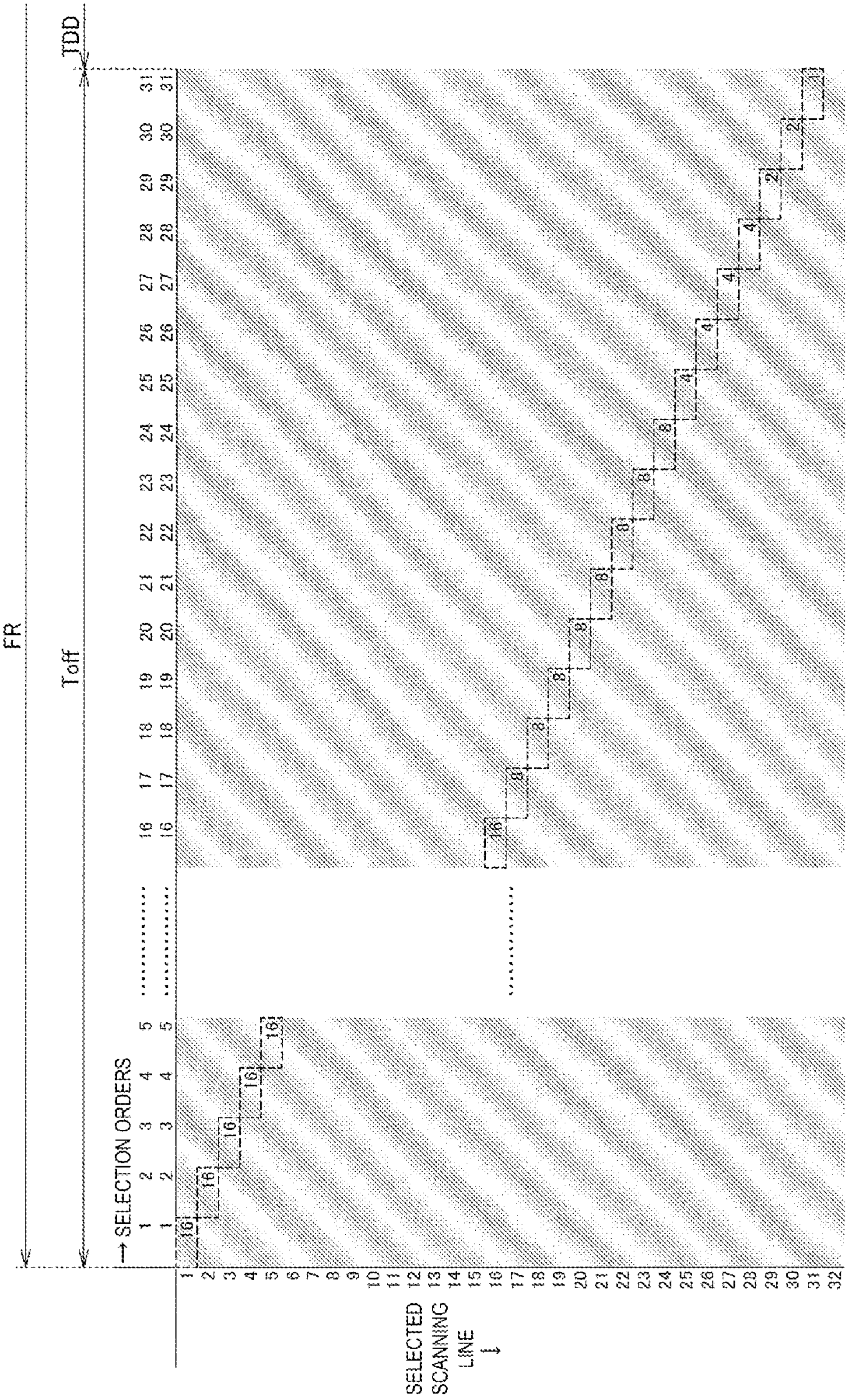
FIG. 11 is a third example of the driving technique.
Figure 12:
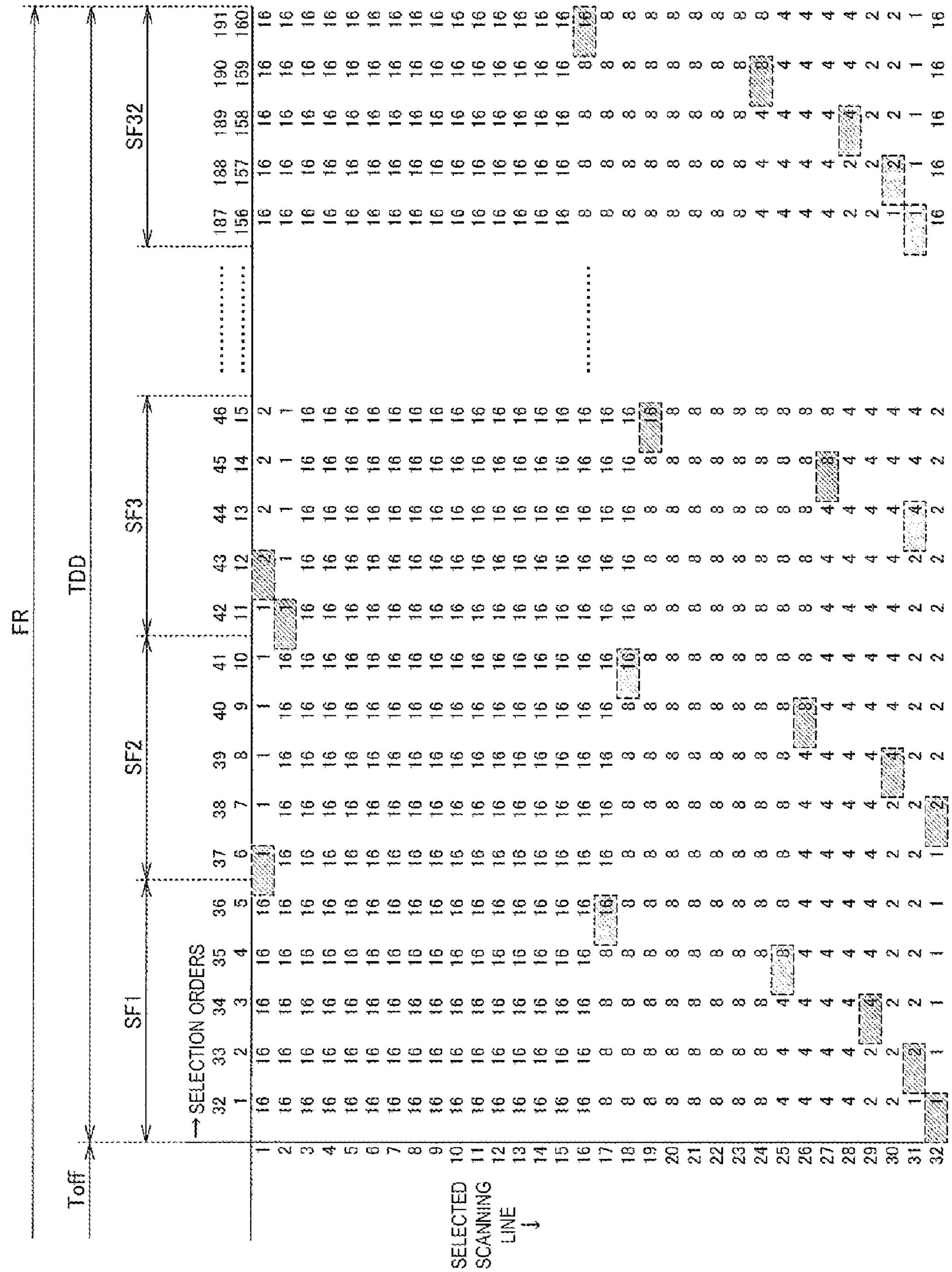
FIG. 12 is the third example of the driving technique.

FIG. 11 and FIG. 12 illustrate a third example of the driving technique in the present exemplary embodiment. Here, description will be given using a case as an example in which the total number of scanning lines included in the pixel array 20 is k=32, the number of bits of display data is n=5, and a multiple is a=1.

FIG. 11 illustrates a driving technique in the all-pixels-light-off period Toff. In the third example, a length of the all-pixels-light-off period Toff is 31 h. The control line driving circuit 130 disables the global enable signal ENGL in the all-pixels-light-off period Toff, thereby turning off all pixels in first to 32nd scanning lines.

In the third example, a fifth bit of the display data is written to the digital driving circuit 36 of the pixel in each of the first to 16th scanning lines. A fourth bit of the display data is written to the digital driving circuit 36 of the pixel in each of the 17th to 24th scanning lines. A third bit of the display data is written to the digital driving circuit 36 of the pixel of each of the 25th to 28th scanning lines. A second bit of the display data is written to the digital driving circuit 36 of the pixel in each of the 29th and 30th scanning lines. A first bit of the display data is written to the digital driving circuit 36 of the pixel in 31st scanning lines.

The display data written to the digital driving circuit 36 during the all-pixels-light-off period Toff is display data of an image displayed in the field FR, and does not include display data for fields other than the field FR.

FIG. 12 illustrates a driving technique in the digital driving period TDD. When n=5 and a=1 in the third example are assigned in the above Equations (1) to (3), $Ndd=((2^5-1)\times 1+1)\times 5=160$, $k=160/5=32$, and $Nfr=32-1+160=191$. As described above, in the third example, the number of scanning lines is 32, the length of the digital driving period TDD is 160 h, and the length of the field FR is 191 h. The number of sub-fields is the same as the number of scanning lines, which is 32. Selection orders 1 to 160 in the digital driving period TDD correspond to selection orders 32 to 191 in the field FR.

In the third example described above, a ratio of the digital driving period TDD in the field FR is 160 h/191 h=0.84, and the digital driving period TDD, which is a lighting period or a display period, is sufficiently ensured. In addition, the first to third examples are examples in which the number of bits n of the display data and the multiple a in the above Equations (1) to (3) are different, and it can be seen that, by adjusting these parameters, it is possible to support electro-optical devices having various numbers of scanning lines.

Figure 13:
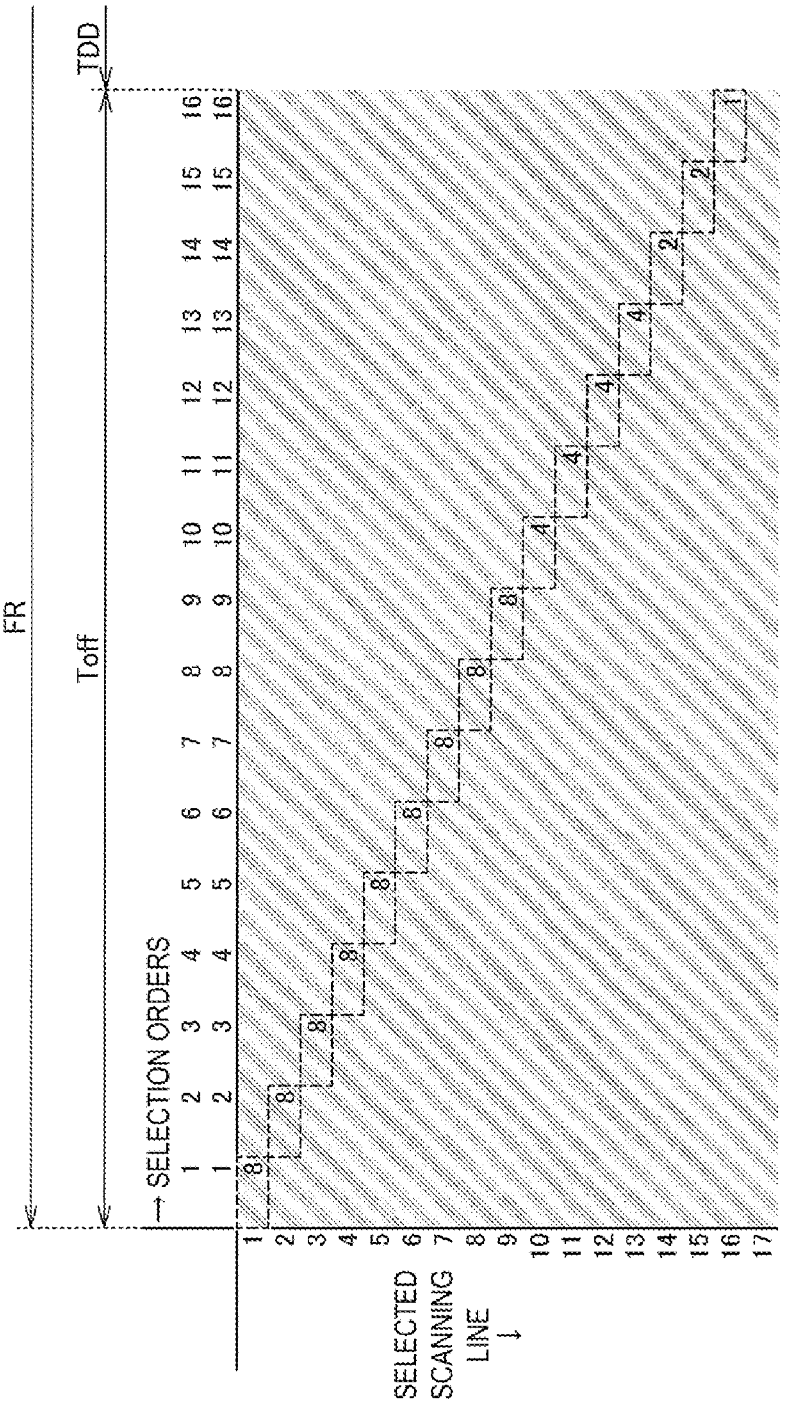
FIG. 13 is a fourth example of the driving technique.
Figure 14:
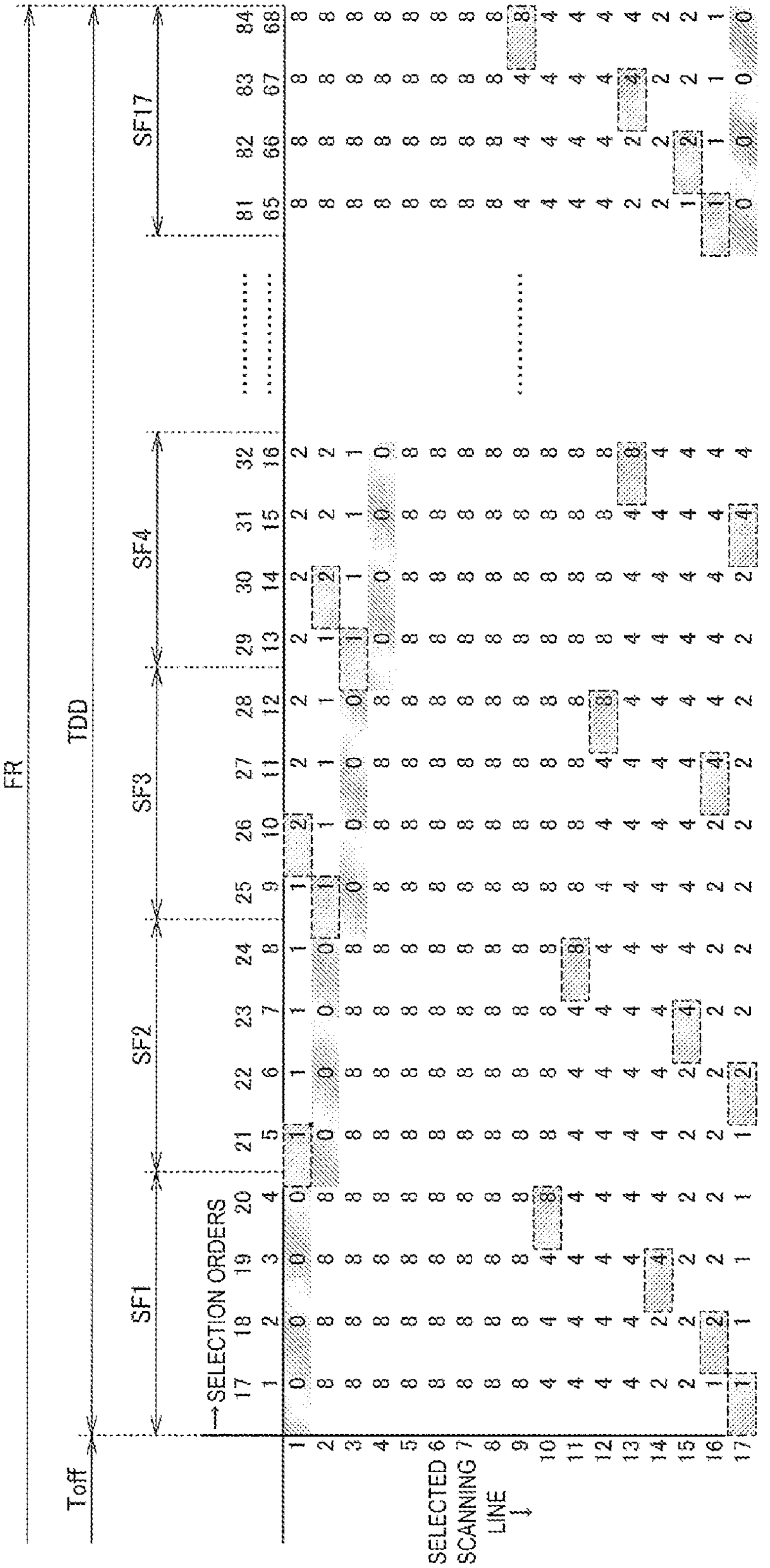
FIG. 14 is the fourth example of the driving technique.

FIG. 13 and FIG. 14 illustrate a fourth example of the driving technique in the present exemplary embodiment. The fourth example is an example of adjusting the number of scanning lines by adding a light-off period to the digital driving period TDD. Here, similarly to the first example, it is assumed that the number of bits of display data is n=4, and a multiple is a=1. As compared to the number of scanning lines k=16 in the first example, in the fourth example, the number of scanning lines k is increased to 17.

FIG. 13 illustrates a driving technique in the all-pixels-light-off period Toff. In the fourth example, a length of the all-pixels-light-off period Toff is 16 h. The control line driving circuit 130 disables the global enable signal ENGL in the all-pixels-light-off period Toff, thereby turning off all pixels in first to 17th scanning lines.

In the fourth example, a fourth bit of display data is written to the digital driving circuit 36 of the pixel in each of the first to ninth scanning lines. Note that, as illustrated in FIG. 14, since the digital driving period TDD for the first scanning line starts from a light-off period, writing need not be performed to the digital driving circuit 36 of the pixel in the first scanning line in the all-pixels-light-off period Toff. A third bit of the display data is written to the digital driving circuit 36 of the pixel in each of the tenth to 13th scanning lines. A second bit of the display data is written to the digital driving circuit 36 of the pixel in each of the 14th and 15th scanning lines. A first bit of the display data is written to the digital driving circuit 36 of the pixel in the 16th scanning line.

The display data written to the digital driving circuit 36 during the all-pixels-light-off period Toff is display data of an image displayed in the field FR, and does not include display data for fields other than the field FR.

FIG. 14 illustrates a driving technique in the digital driving period TDD. As described in the first example, the digital driving period TDD includes the first to fourth scanning line selection periods and the first to fourth display periods. In the fourth example, the digital driving period TDD further includes a light-off period for one sub-field. In FIG. 14, a cell that is not surrounded by a dotted line and is hatched indicates a light-off period. A cell surrounded by a dotted line is a scanning line selection period in which a bit is written to a pixel circuit, a light-emitting element is also turned off in the scanning line selection period, but here, the "light-off period" refers to a newly provided light-off period other than a scanning line selection period in which a bit is written to a pixel circuit. In FIG. 14, an example is illustrated in which a light-off period is provided between a fourth display period and a first scanning line selection period, but any setting timing may be used for the light-off period.

The first scanning line will be described as an example. In selection orders 1 to 4 in the digital driving period TDD, the control line driving circuit 130 outputs the disabled enable signal EN1. As a result, the digital driving circuit 36 in the first scanning line is disabled and does not output a drive current, so a pixel in the first scanning line is turned off.

Next, in selection order 5, the scanning line driving circuit 110 selects the first digital scanning line, and the digital signal line driving circuit 120 outputs the first bit of the display data. As a result, the first bit is written to the digital driving circuit 36. In each of subsequent selection orders 6 to 9, the pixel circuit 30 turns on or off the light-emitting element 31 based on the first bit held in the digital driving circuit 36.

Similarly, in selection orders 10, 19 and 36, the scanning line driving circuit 110 selects the first digital scanning line, and the digital signal line driving circuit 120 outputs the second bit, the third bit, and the fourth bit, respectively. In this way, the second bit, the third bit, and the fourth bit are written to the digital driving circuit 36 in the selection orders 10, 19 and 36, respectively. In each of subsequent selection orders 11 to 18, 20 to 35, and 37 to 68, the pixel circuit 30 turns on or off the light-emitting element 31 based on the second bit, the third bit, and the fourth bit held in the digital driving circuit 36, respectively.

A number obtained by dividing a length of a light-off period included in the digital driving period TDD by a length of a sub-field is defined as b. At this time, the total number of scanning line selections Ndd in the digital driving period TDD is obtained by the following Equation (4), k, which is the number of scanning lines, is obtained by the following Equation (5), and the total number of scanning line selections Nfr in the field FR is obtained by the following Equation (6).

$$Ndd=((2^n-1)\times a+1)\times n+b\times n \quad (4)$$

$$k=((2^n-1)\times a+1)+b \quad (5)$$

$$Nfr=k-1+((2^n-1)\times a+1)\times n+b\times n \quad (6)$$

When n=4, a=1, and b=1 in the fourth example are applied, $Ndd=((2^4-1)\times 1+1)\times 4+1\times 4=68$, $k=68/4=17$, and $Nfr=17-1+68=84$, and are consistent with FIG. 13 and FIG. 14. Note that, it is sufficient that b is an integer equal to or greater than 0, and b=0 means that no light-off period is provided in the digital driving period TDD. In the first example to the third example, b=0.

In the fourth example described above, a ratio of the digital driving period TDD in the field FR is 68 h/84 h=0.81, and the digital driving period TDD, which is a lighting period or a display period, is sufficiently ensured. Additionally, in the above Equations (4) to (6), by providing the parameter b for the light-off period, fine adjustment of the number of scanning lines is possible. In this way, it is possible to reduce dummy scanning lines operating inside the electro-optical device 15 but not actually displayed. Note that, an example including the dummy scanning lines will be illustrated in a fifth example.

In the present exemplary embodiment described above, the length of the first display period is a times the length of the sub-field. The number of scanning line selections in the digital driving period TDD is Ndd, the number of bits of display data is n, and a length of a light-off period in the digital driving period TDD is b times a length of a sub-field. At this time, $Ndd=((2^n-1)\times a+1)\times n+b\times n$.

According to the present exemplary embodiment, in a range where k, which is the number of the scanning lines, can be an integer, n, which is the number of bits of display data, the multiple a indicating a length of a display period for the first bit, and the parameter b indicating the length of the light-off period in the digital driving period can be freely adjusted. Accordingly, it is possible to support display panels having various numbers of pixels.

Further, in the present exemplary embodiment, the number of scanning line selections in the field FR is defined as Nfr, and the number of the plurality of digital scanning lines LDSC1 to LDSCk is k. At this time, $Nfr \geq Ndd+k-1$. Note that, $Nfr=Ndd+k-1$ in the first to fourth examples. An example of $Nfr>Ndd+k-1$ will be described later in a seventh example.

According to the present exemplary embodiment, the length of the all-pixels-light-off period Toff is equal to or greater than (k−1)h. Thus, in the all-pixels-light-off period Toff, to the digital driving circuit 36 of the pixel in each of the first to k-th scanning lines, the image data of the image displayed in the frame can be written. Accordingly, images in respective fields are not mixed, and are displayed in digital driving periods for respective fields.

5. Other Examples of Driving Technique

A fifth example is an example in compliance with full hi-vision standards. The number of bits of display data is n=5, and a multiple is a=35. From the above Equations (1) to (3), the total number of scanning line selections in the digital driving period TDD is Ndd=5430, the number of scanning lines is k=1086, and the total number of scanning line selections in the field FR is Nfr=6515. Since the number of scanning lines in the full hi-vision standards is 1080, the six scanning lines, among k=1086, are dummy scanning lines that operate inside the electro-optical device 15 but are not actually displayed.

In the fifth example, a ratio of the digital driving period TDD in the field FR is 5430 h/6515 h=0.83, and the digital driving period TDD, which is a lighting period or a display period, is sufficiently ensured.

A sixth example is an example in compliance with super hi-vision standards. The number of bits of display data is n=12, a multiple is a=1, and a parameter for a light-off period is b=2688. From the above Equations (4) to (6), the total number of scanning line selections in the digital driving period TDD is Ndd=51840, the number of scanning lines is k=4320, and the total number of scanning line selections in the field FR is Nfr=56159. The number of scanning lines in the super hi-vision standards is 4320, and by adjusting the parameter b for a light-off period, it is possible to be in compliance with the super hi-vision standards without providing a dummy scanning line.

In the sixth example, a ratio of the digital driving period TDD in the field FR is 51840 h/56159 h=0.92, and the digital driving period TDD, which is a lighting period or a display period, is sufficiently ensured. It can be seen from comparisons to the other examples that there is a tendency that a ratio of lighting periods increases when the number of scanning lines is large.

The seventh example is an example for intentionally shortening a lighting time by increasing the all-pixels-light-off period Toff. From the perspective of display brightness, it is desirable that the lighting period is long, but from the perspective of reducing moving image blurring, it is desirable that the lighting period is short in some cases. For example, when a head moves in an AR display in a head-mounted display, moving image blurring can be reduced when the lighting period is shorter.

The number of bits of display data is n=4, a multiple is a=1, and the all-pixels-light-off period Toff is extended by 40 h. This is an example in which the all-pixels-light-off period Toff in the first example is extended by 40 h. From the above Equations (1) and (2), the total number of scanning line selections in the digital driving period TDD is Ndd=64, and the number of scanning lines is k=16. A length of the all-pixels-light-off period Toff is (16−1)h+40 h=55 h, so the total number of scanning line selections in the field FR is Nfr=55+64=119.

In the seventh example, a ratio of the digital driving period TDD in the field FR is 64 h/119 h=0.54, and the lighting period is shorter as compared to 0.81 in the first example. According to the electro-optical device 15 of the present exemplary embodiment, it is also possible to increase the lighting period and perform displaying at high brightness as in the first example, and it is also possible to decrease the lighting period and perform displaying in which moving image blurring is further reduced as in the seventh example. That is, according to the electro-optical device 15 of the present exemplary embodiment, a selection order pattern can be adjusted in accordance with various usage conditions.

6. Second Configuration Example of Electro-optical Device and Display System

Figure 15:
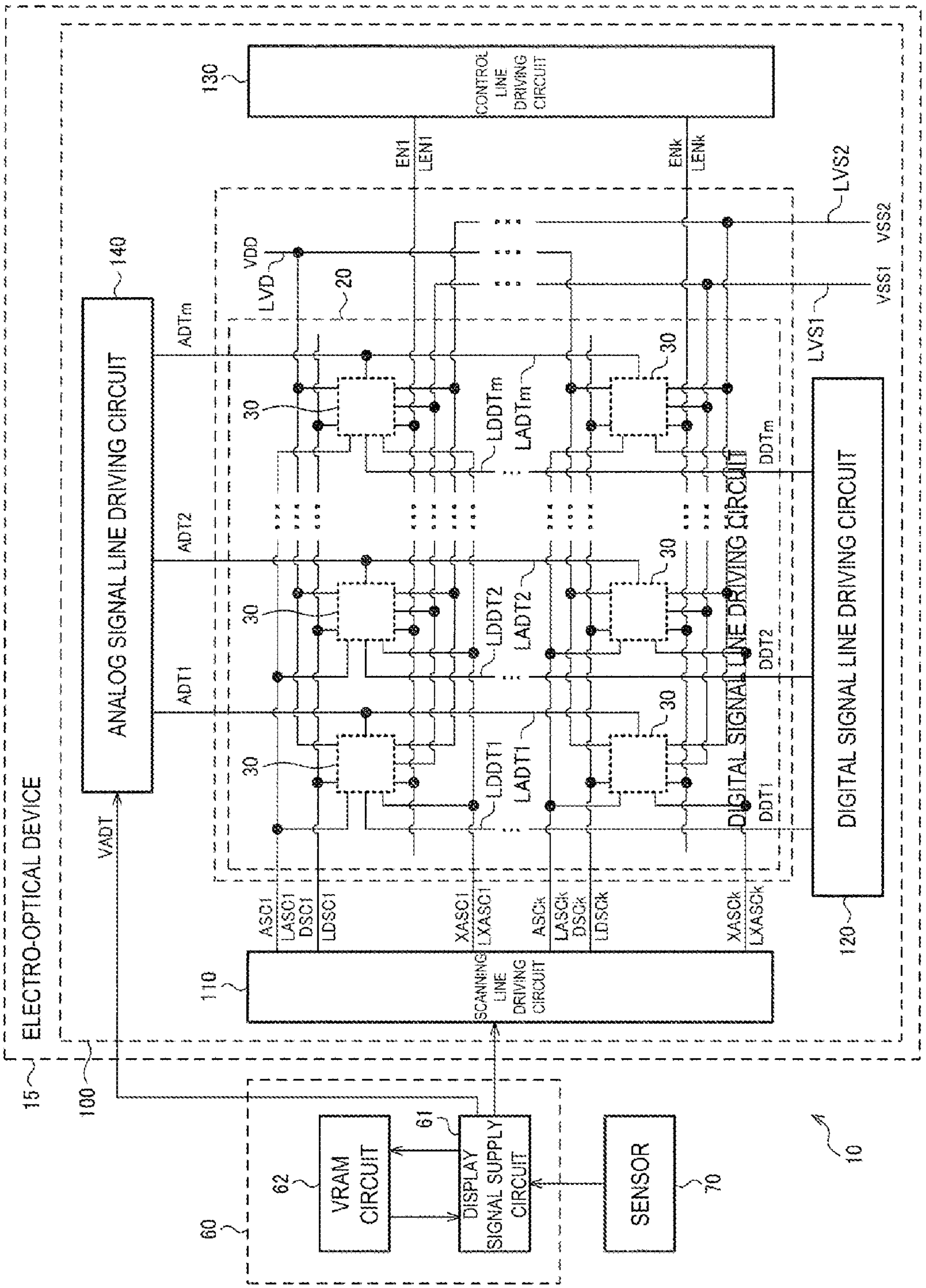
FIG. 15 is a second configuration example of the electro-optical device and the display system.

FIG. 15 is a second configuration example of the electro-optical device 15 and the display system 10 in the present exemplary embodiment. In the second configuration example, the display system 10 further includes a sensor 70. The second configuration example is a configuration example in which the pixel circuit 30 does not perform threshold value compensation. Note that the same components as the components already described are assigned the same reference numerals, and a description of the components will be omitted as appropriate.

The display signal supply circuit 61 outputs an analog data voltage VADT to the circuit device 100 based on brightness information of environment. The sensor 70 is a sensor that detects the brightness information of the environment, and is, for example, a photodiode or an image sensor. The display signal supply circuit 61 controls the analog data voltage VADT such that a current value of a drive current decreases as brightness of the environment lowers. Note that, although the example in which the display signal supply circuit 61 outputs the analog data voltage VADT has been described here, a voltage generation circuit or the like built into an electronic apparatus mounted with the electro-optical device 15 may output the analog data voltage VADT.

The circuit device 100 further includes an analog signal line driving circuit 140. The pixel array 20 further includes analog scanning lines LASC1 to LASCk, analog inversion scanning lines LXASC1 to LXASCk, and analog signal lines LADT1 to LADTm.

The analog scanning line LASC1 and the analog inversion scanning line LXASC1 are coupled to the row pixel circuit 30 in a first row. The scanning line driving circuit 110 outputs an analog selection signal ASC1 to the analog scanning line LASC1, and outputs an analog inversion selection signal XASC1, which is a logical inversion signal of the analog selection signal ASC1, to the analog inversion scanning line LXASC1. Similarly, the analog scanning lines LASC2 to LASCk and the analog inversion scanning lines LXASC2 to LXASCk are coupled to the pixel circuits 30 in second to k-th rows, respectively. The scanning line driving circuit 110 outputs analog selection signals ASC2 to ASCk to the analog scanning lines LASC2 to LASCk, respectively, and outputs analog inversion selection signals XASC2 to XASCk, which are logical inversion signals of the respective analog selection signals ASC2 to ASCk, to the analog inversion scanning lines LXASC2 to LXASCk, respectively.

The analog signal line LADT1 is coupled to the pixel circuit 30 in a first column. The analog signal line driving circuit 140 generates an analog data voltage ADT1 subjected to threshold value compensation from the analog data voltage VADT, and outputs the analog data voltage ADT1 to the analog signal line LADT1. Similarly, the analog signal lines LADT2 to LADTm are coupled to the pixel circuits 30 in second to m-th columns, respectively. The analog signal line driving circuit 140 generates analog data voltages ADT2 to ADTm subjected to the threshold value compensation from the analog data voltage VADT, and outputs the analog data voltages ADT2 to ADTm to the analog signal lines LADT2 to LADTm, respectively.

Here, the threshold value compensation is to compensate for a threshold value variation of a transistor that generates a drive current of a light-emitting element, to compensate for a variation in the drive current. The analog signal line driving circuit 140 stores k×m compensation values corresponding to the pixel circuits 30 in k rows by m columns, and generates the analog data voltages ADT1 to ADTm by compensating for the analog data voltage VADT with m compensation values corresponding to the m pixel circuits 30 coupled to a selected analog scanning line.

Figure 16:
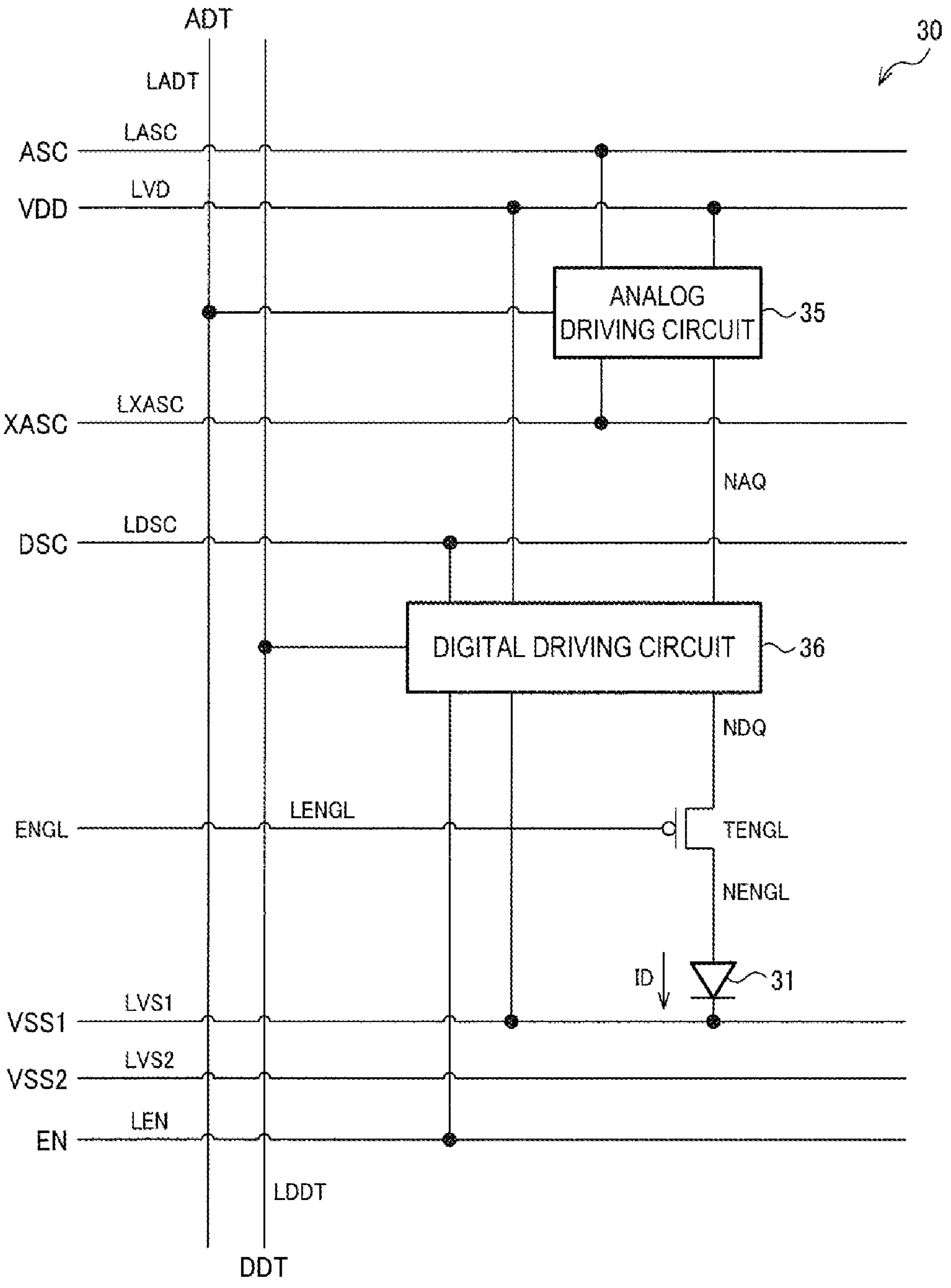
FIG. 16 is a second configuration example of the pixel circuit.

FIG. 16 is a second configuration example of the pixel circuit 30. The pixel circuit 30 further includes an analog driving circuit 35. Note that, in FIG. 16, 1 to k and 1 to m are omitted in ASC1 to ASCk, DSC1 to DSCk, ADT1 to ADTm, DDT1 to DDTm, and the like.

The analog driving circuit 35 takes in the analog data voltage ADT when the analog scanning line LASC and the analog inversion scanning line LXASC are selected, and holds the analog data voltage ADT. The analog driving circuit 35 causes a drive current of a current value specified by the held analog data voltage ADT to flow from the power supply line LVD to the node NAQ. Hereinafter, the operation of setting this drive current is referred to as analog current setting. In the present exemplary embodiment, all the pixel circuits 30 performs the analog current setting at the same time in the all-pixels-light-off period Toff.

The digital driving circuit 36 is similar to that in FIG. 3. However, a source of the P-type transistor TB2 is coupled to the node NAQ.

Figure 17:
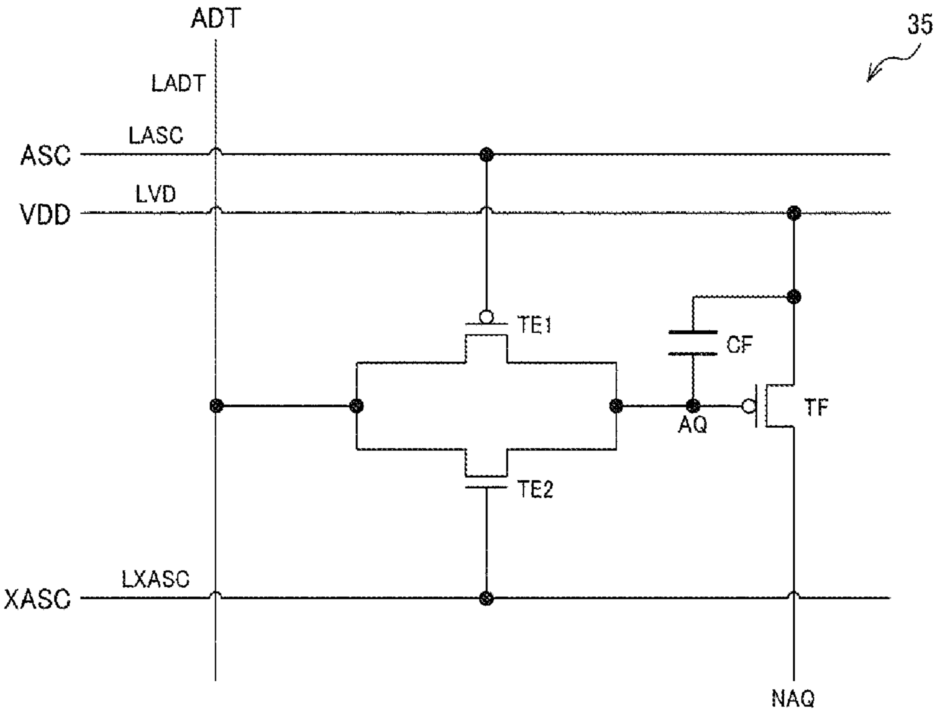
FIG. 17 is a first configuration example of an analog driving circuit.

FIG. 17 is a first configuration example of the analog driving circuit 35. The analog driving circuit 35 includes P-type transistors TE1, TF, an N-type transistor TE2, and a capacitor CF. Note that, in FIG. 17, 1 to k, and 1 to m are omitted in ASC1 to ASCk, ADT1 to ADTm, and the like.

The P-type transistor TE1 and the N-type transistor TE2 are switch circuits provided between the analog signal line LADT and one end of the capacitor CF. Specifically, one of a source and a drain of each of the P-type transistor TE1 and the N-type transistor TE2 is coupled to the analog signal line LADT, and another is coupled to a gate of the P-type transistor TF. A gate of the P-type transistor TE1 is coupled to the analog scanning line LASC, and a gate of the N-type transistor TE2 is coupled to the analog inversion scanning line LXASC. A source of the transistor TF is coupled to the power supply line LVD, and a drain is coupled to the node NAQ. One end of the capacitor CF is coupled to the gate of the P-type transistor TF, and another end is coupled to the source of the P-type transistor TF.

The capacitor CF holds the analog data voltage ADT input from the analog signal line LADT. The P-type transistor TF is a current supply transistor, and supplies a drive current in accordance with the analog data voltage ADT held in the capacitor CF to the digital driving circuit 36.

Figure 18:
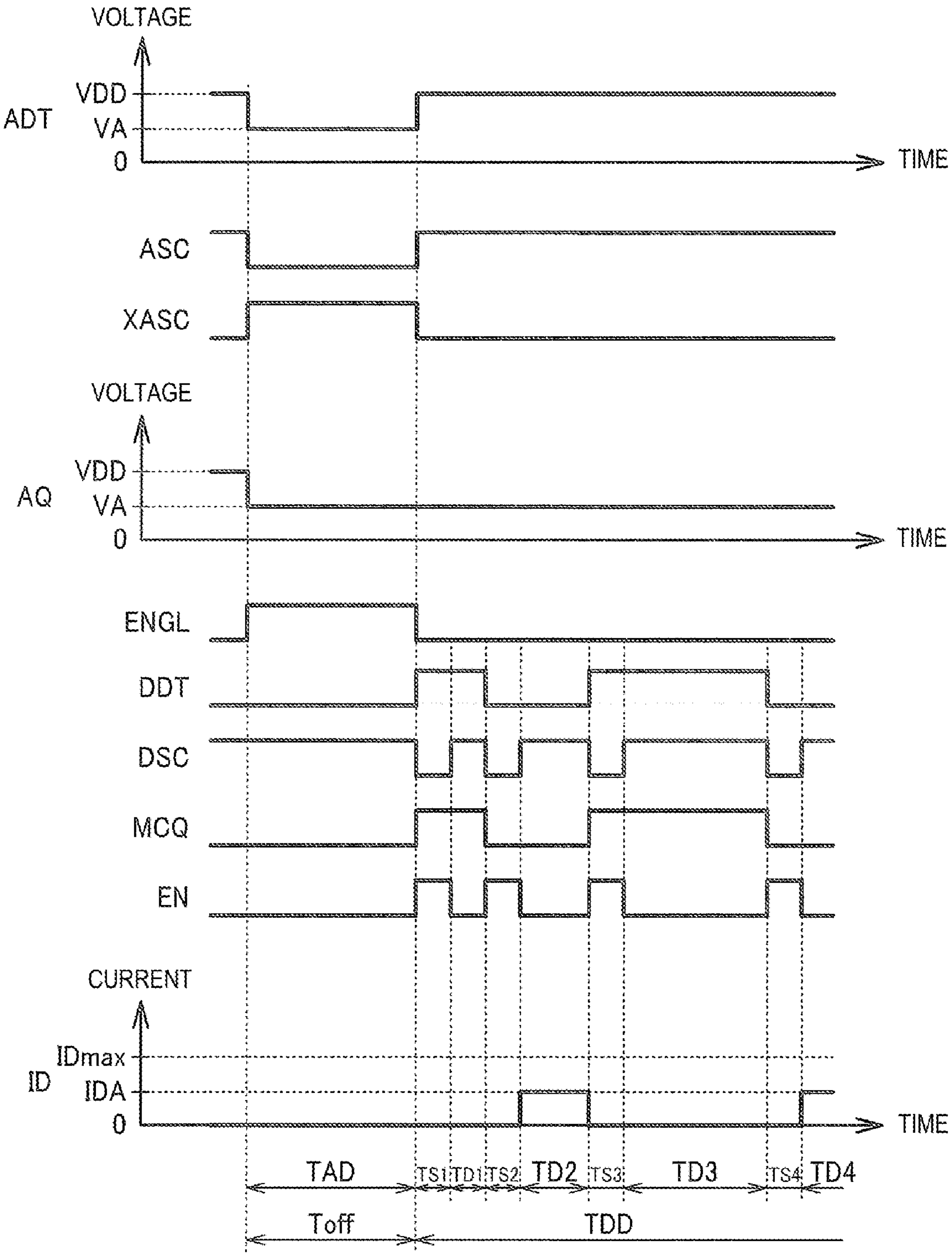
FIG. 18 is a signal waveform example in a second configuration example of the electro-optical device.
Figure 19:
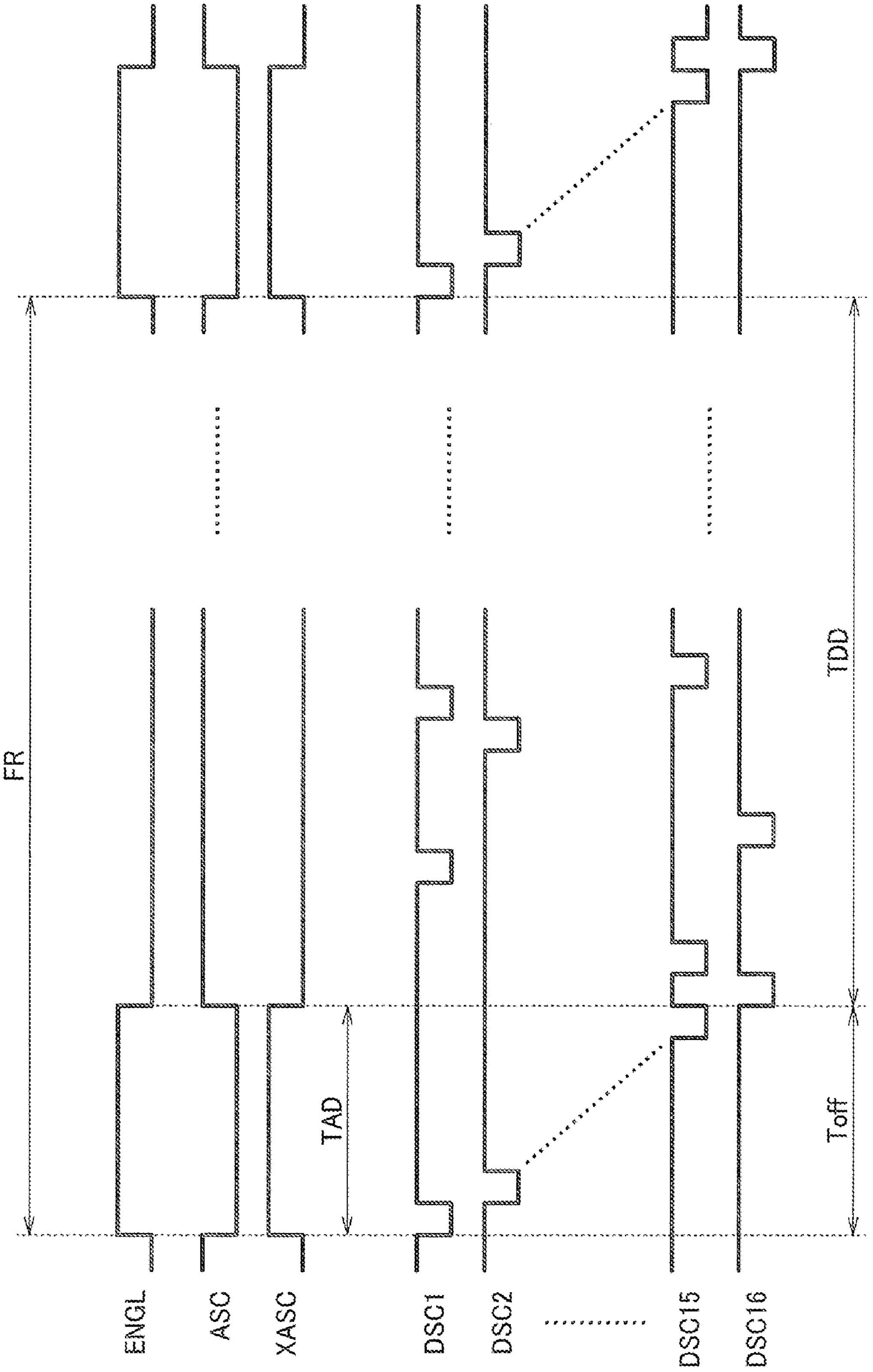
FIG. 19 is a signal waveform example in the second configuration example of the electro-optical device.

In each of FIG. 18 and FIG. 19, a signal waveform example in the second configuration example of the electro-optical device 15 is illustrated. Note that, an outline of a signal waveform is illustrated here, and a length of each period is not necessarily an actual length.

A driving technique related to digital driving is similar to the driving technique described in the first configuration example of the electro-optical device 15. In the second configuration example of the electro-optical device 15, analog driving is further combined to these techniques. In FIG. 18 and FIG. 19, a signal waveform example will be explained in which the analog driving is combined to the first example of the driving technique described with reference to FIG. 5 and FIG. 6.

FIG. 18 illustrates the signal waveform example in which the analog driving is combined to the signal waveform in FIG. 7. FIG. 19 illustrates the signal waveform example in which the analog driving is combined to the signal waveform in FIG. 8.

A current setting period TAD is included in the all-pixels-light-off period Toff. In each of FIG. 18 and FIG. 19, an example is illustrated in which a length of the current setting period TAD is the same as that of the all-pixels-light-off period Toff, but the length of the current setting period TAD may be shorter than the length of the all-pixels-light-off period Toff. In FIG. 18, a signal waveform example of the 16th scanning line is illustrated, but as illustrated in FIG. 19, the current setting period TAD is set to the same period in all the first to 16th scanning lines.

FIG. 18 illustrates an example in which a current value of the drive current ID is set such that IDA<IDmax. In the current setting period TAD, the analog driving circuit 35 outputs the analog data voltage ADT=VA corresponding to the current value IDA. Additionally, the scanning line driving circuit 110 outputs the analog selection signal ASC at the low level and the analog inversion selection signal XASC at the high level. At this time, the P-type transistor TE1 and the N-type transistor TE2 of the analog driving circuit 35 are on, and a voltage AQ at one end of the capacitor CF is the analog data voltage ADT=VA. At the end of the current setting period TAD, the scanning line driving circuit 110 sets the analog selection signal ASC to the high level and sets the analog inversion selection signal XASC to the low level. At this time, the P-type transistor TE1 and the N-type transistor TE2 are turned off, and the voltage AQ=VA is held at the one end of the capacitor CF.

When the digital driving circuit 36 causes a drive current to flow through the light-emitting element 31 in the digital driving period TDD, the analog driving circuit 35 causes the drive current ID=IDA corresponding to the analog data voltage ADT=VA to flow, and thus the drive current ID=IDA flows through the light-emitting element 31. In the example illustrated in FIG. 18, the drive current ID=IDA flows through the light-emitting element 31 in the display periods TD2 and TD4.

According to the present exemplary embodiment, while a gray scale of an image is displayed by the digital driving, display brightness of an entire screen can be adjusted by the analog driving. For example, when the analog data voltage ADT is controlled by three-bit brightness adjustment data, the drive current ID flowing through the light-emitting element 31 is controlled to be 1/8, 2/8, . . . , or 8/8 times a maximum current IDmax. In this way, the display brightness is controlled in eight gray scales. For example, by setting display brightness to the maximum brightness in a bright environment, and setting display brightness to low brightness in a dark environment, visibility of a display image can be ensured in environments in various types of brightness.

Furthermore, by performing the analog current setting in the all-pixels-light-off period Toff, it is possible to ensure the current setting period TAD of a sufficient length to write the analog data voltage ADT. In addition, since the analog current setting need not be performed in the digital driving period TDD, the control is simplified.

Figure 20:
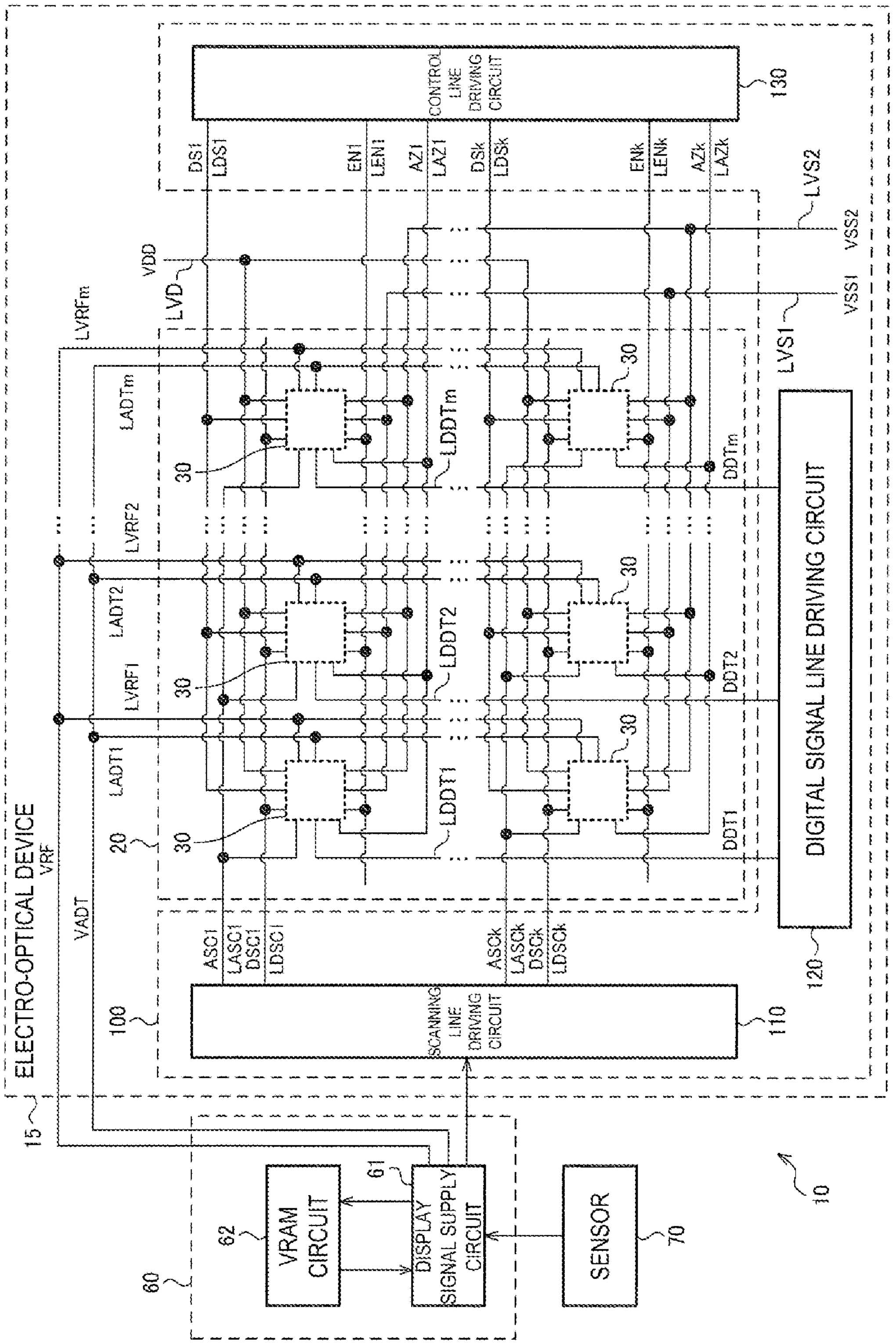
FIG. 20 is a third configuration example of the electro-optical device and the display system.

FIG. 20 is a third configuration example of the electro-optical device 15 and the display system 10. In the third configuration example, the pixel circuit 30 performs threshold value compensation, and the analog driving circuit 35 is omitted. Hereinafter, parts different from those in the second configuration example will be mainly described, and description of parts similar to those in the second configuration example will be omitted as appropriate.

The pixel array 20 includes the pixel circuits 30 in k rows by m columns, compensation control signal lines LDS1 to LDSk, LAZ1 to LAZk, reference voltage lines LVRF1 to LVRFm, the analog scanning lines LASC1 to LASCk, the digital scanning lines LDSC1 to LDSCk, the enable signal lines LENT to LENk, the analog signal lines LADT1 to LADTm, the digital signal lines LDDT1 to LDDTm, the power supply line LVD, the ground lines LVS1 and LVS2.

One end of each of the analog signal lines LADT1 to LADTm is commonly coupled to a node at the analog data voltage VADT. That is, the common analog data voltage VADT is applied to the analog signal lines LADT1 to LADTm.

The compensation control signal lines LDS1 and LAZ1 are coupled to the pixel circuit 30 in a first row, the control line driving circuit 130 outputs a compensation control signal DS1 to the compensation control signal line LDS1, and outputs a compensation control signal AZ1 to the compensation control signal line LAZ1. Similarly, the compensation control signal lines LDS2 to LDSk, LAZ2 to LAZk are coupled to the pixel circuits 30 in second to k-th rows, respectively, and the control line driving circuit 130 outputs the compensation control signals DS2 to DSk to the compensation control signal lines LDS2 to LDSk, respectively, and outputs the compensation control signals AZ2 to AZk to the compensation control signal lines LAZ2 to LAZk, respectively.

The reference voltage line LVRF1 is coupled to the pixel circuit 30 in a first column. Similarly, the reference voltage lines LVRF2 to LVRFm are coupled to the pixel circuits 30 in second to m-th columns, respectively. The display signal supply circuit 61 outputs a reference voltage VFR. One end of each of the reference voltage lines LVRF1 to LVRFm is commonly coupled to a node at the reference voltage VFR, and the common reference voltage VFR is applied to the reference voltage lines LVRF1 to LVRFm. Note that, similarly to the analog data voltage VADT, a voltage generation circuit or the like (not illustrated) may output the reference voltage VRF.

Figure 21:
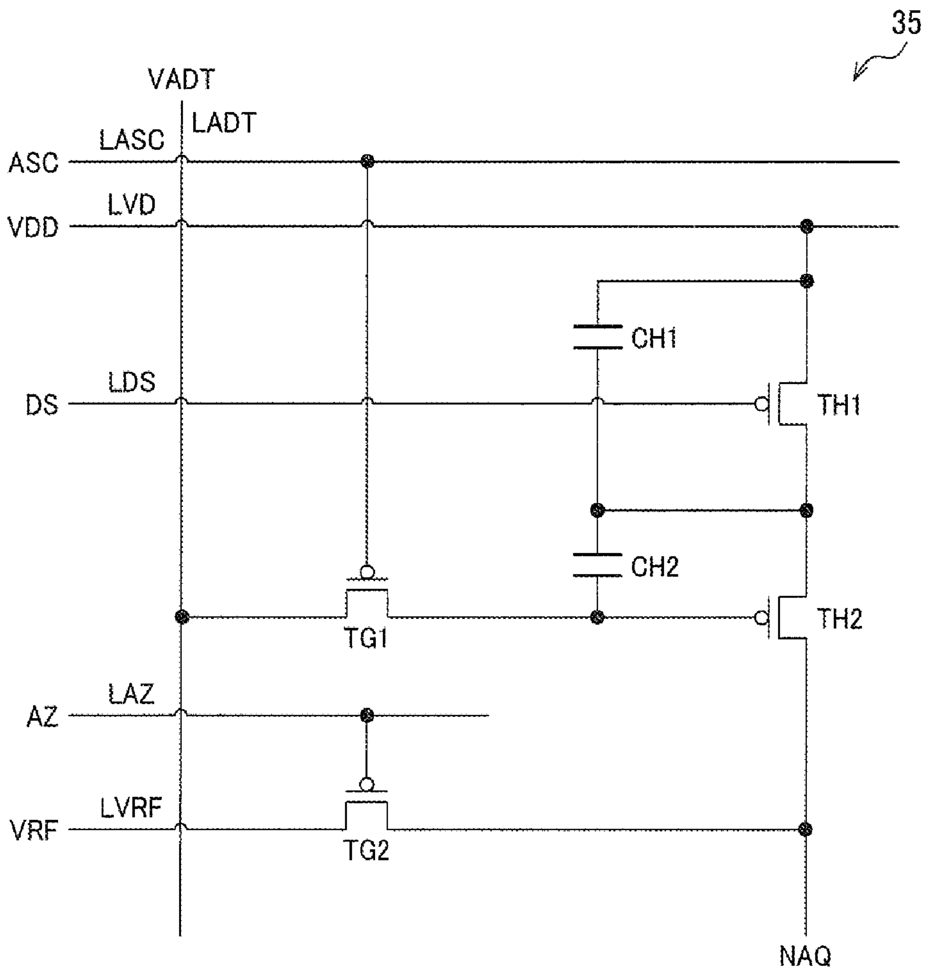
FIG. 21 is a second configuration example of the analog driving circuit.

The pixel circuit 30 in the present configuration example is basically similar to that in FIG. 16, but the configuration of the analog driving circuit 35 in the present configuration example is different from that in FIG. 17. FIG. 21 illustrates a second configuration example of the analog driving circuit 35. Analog driving circuit 35 includes P-type transistors TG1, TG2, TH1, TH2, capacitors CH1 and CH2. Note that, in FIG. 21, 1 to k, and 1 to m are omitted in ASC1 to ASCk, ADT1 to ADTm, and the like.

The P-type transistor TG1 is a switch circuit provided between the analog signal line LADT and one end of the capacitor CH2. Specifically, one of a source and a drain of the P-type transistor TG1 is coupled to the analog signal line LADT, and another is coupled to a gate of the P-type transistor TH2 and the one end of the capacitor CH2. A gate of the P-type transistor TG1 is coupled to the analog scanning line LASC.

One of a source and a drain of the P-type transistor TG2 is coupled to the reference voltage line LVRF, and another is coupled to the node NAQ. The gate of the P-type transistor TG1 is coupled to the compensation control signal line LAZ.

A source of the P-type transistor TH1 is coupled to the power supply line LVD, and a drain is coupled to a source of the P-type transistor TH2 and another end of the capacitor CH2. One end of the capacitor CH1 is coupled to a drain of the P-type transistor TH1 and the other end of the capacitor CH2, and another end is coupled to the power supply line LVD. A drain of the P-type transistor TH2 is coupled to the node NAQ.

The capacitor CH2 holds analog data voltage VADT. The P-type transistor TH2 is a current supply transistor, and supplies a drive current in accordance with the analog data voltage VADT held in the capacitor CH2 to the digital driving circuit 36.

Figure 22:
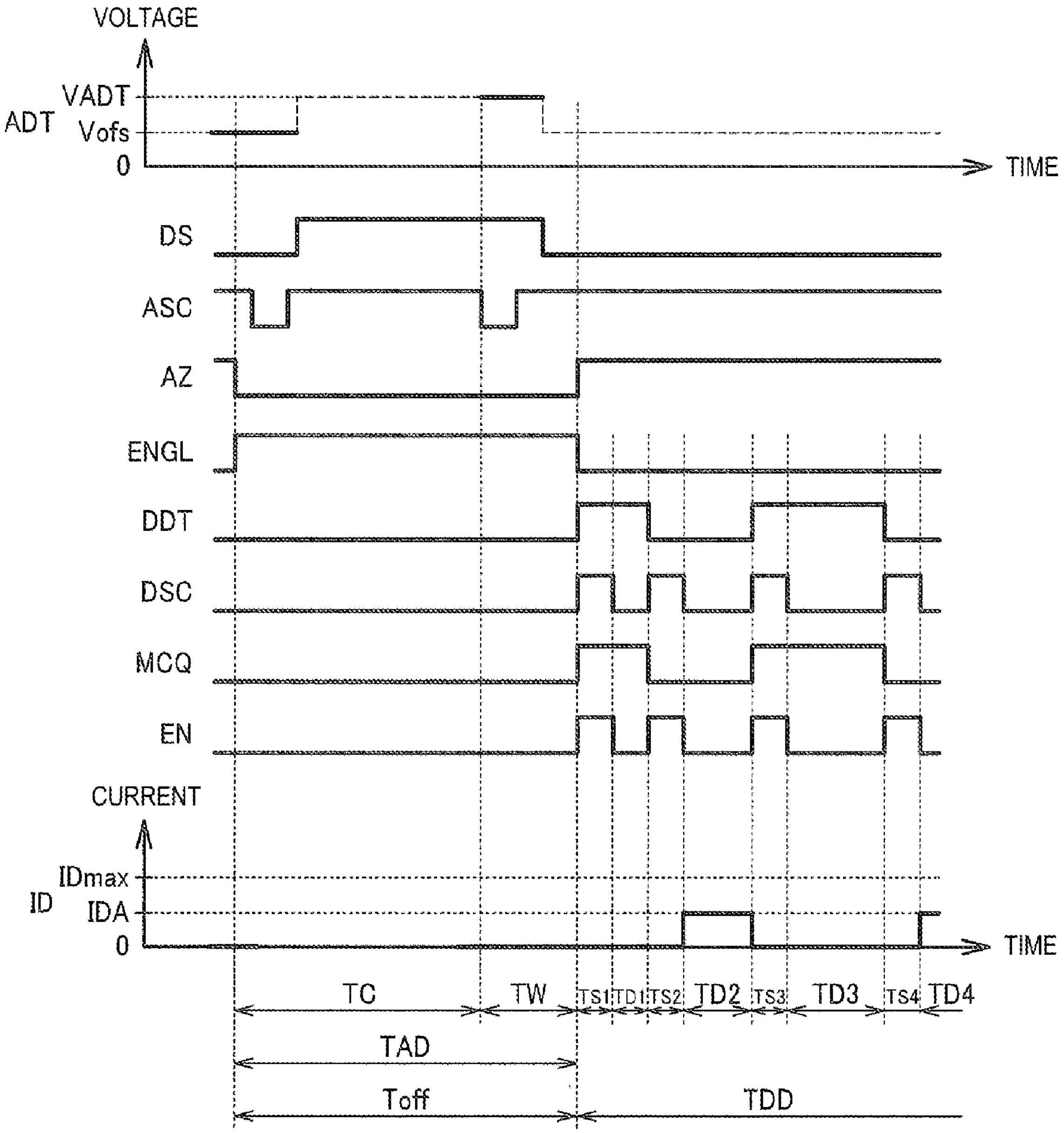
FIG. 22 is a signal waveform example in a third configuration example of the electro-optical device.

FIG. 22 illustrates a signal waveform example in the third configuration example of the electro-optical device 15. Note that, an outline of a signal waveform is illustrated here, and a length of each period is not necessarily an actual length.

Driving technique in the third configuration example of the electro-optical device 15 is basically similar to the driving technique described in the second configuration example of the electro-optical device 15. However, in the third configuration example of the electro-optical device 15, threshold value compensation is performed in the current setting period TAD. In FIG. 22, parts different from those in the signal waveform example in FIG. 18 will be mainly described, and description of similar parts will be omitted as appropriate.

In the current setting period TAD, the control line driving circuit 130 outputs the compensation control signal AZ at the low level. Thus, the P-type transistor TG2 is on, and the reference voltage VFR is applied to the node NAQ.

The current setting period TAD is divided into a threshold value compensation period TC and a subsequent writing period TW. In the threshold value compensation period TC, first, the analog data voltage VADT is set to an offset voltage Vofs. At this time, the control line driving circuit 130 outputs the compensation control signal DS at the low level. In this way, the P-type transistor TH1 is on, and the power supply voltage VDD is applied to the other end of the capacitor CH2. In this state, the scanning line driving circuit 110 sets the analog selection signal ASC from the high level to the low level. The P-type transistor TG1 is turned on from off, and the offset voltage Vofs is applied to the one end of the capacitor CH2. The scanning line driving circuit 110 sets the analog selection signal ASC from the low level to the high level, and the P-type transistor TG1 is turned off from on, and the capacitor CH2 holds a potential difference of VDD−Vofs. After this, the control line driving circuit 130 sets the compensation control signal DS from the low level to the high level. This turns the P-type transistor TH1 off from on. Since the offset voltage Vofs is applied to the gate of the P-type transistor TH2, a current flows through the P-type transistor TH2, a source voltage of the P-type transistor TH2 decreases, and a voltage of the gate coupled by the capacitor CH2 also decreases. At this time, each of the capacitors CH1 and CH2 holds a charge reflecting a threshold value voltage of the P-type transistor TH2.

In the writing period TW, the analog data voltage VADT is set to VA. The scanning line driving circuit 110 sets the analog selection signal ASC from the high level to the low level. The P-type transistor TG1 is turned on from off, and the analog data voltage VADT=VA is applied to the one end of the capacitor CH2. The scanning line driving circuit 110 sets the analog selection signal ASC from the low level to the high level, and the P-type transistor TG1 is turned off from on. After this, the control line driving circuit 130 sets the compensation control signal DS from the high level to the low level. This turns the P-type transistor TH1 on from off. In this process, each of the capacitors CH1 and CH2 holds a charge reflecting the threshold value voltage of the P-type transistor TH2, thus a gate voltage of the P-type transistor TH2 is set to an analog data voltage subjected to the threshold value compensation.

At the end of the current setting period TAD, the control line driving circuit 130 sets the compensation control signal AZ from the low level to the high level. This turns the P-type transistor TG2 off from on.

In the present exemplary embodiment described above, the electro-optical device 15 includes the plurality of analog scanning lines LASC1 to LASCk, and the analog signal line LADT. The analog signal line LADT is one of LADT1 to LADTk. Each pixel circuit 30 is coupled to the analog scanning line LASC included in the plurality of analog scanning lines LASC1 to LASCk, and the analog signal line LADT. The analog scanning line LASC is one of LASC1 to LASCk. Each pixel circuit 30 includes the analog driving circuit 35. When the analog driving circuit 35 is selected by the analog scanning line LASC, the analog data voltage ADT is written to the analog driving circuit 35 from the analog signal line LADT, and a current value of the drive current ID is set variably based on the analog data voltage ADT. This is referred to as analog current setting.

According to the present exemplary embodiment, the analog driving circuit 35 adjusts the drive current ID variably, and the digital driving circuit 36 performs the digital driving of the light-emitting element 31 by the drive current ID. As a result, emission brightness when the light-emitting element 31 is on is adjusted, and thus all gray scales 0 to 255 can be used even in a dark environment, and both adjustment of display brightness in accordance with brightness of environment, and good gray scale display can be achieved. In addition, since the display brightness is adjusted by the analog driving independent of a gray scale display by the digital driving, the drive current ID is obtained with which the light-emitting element 31 stably emits light even in a dark environment.

In addition, in the present exemplary embodiment, the analog driving circuits 35 of the plurality of pixel circuits 30 perform the analog current setting in the all-pixels-light-off period Toff.

Since the analog driving adjusts display brightness of an entire screen, an analog data voltage is the same on the entire screen for a display image of the same frame. In the present exemplary embodiment, since a display frame is simultaneously switched in all scanning lines, the analog current setting can be performed simultaneously in all the scanning lines. Furthermore, since the analog current setting is performed in the all-pixels-light-off period Toff, a period for performing the analog current setting in the digital driving period TDD is unnecessary, and the drive control is simplified. Furthermore, since the all-pixels-light-off period Toff has a sufficient time for analog data voltage writing, a time for the analog data voltage writing can be sufficiently ensured even in a high-definition display panel or the like.

In addition, in the present exemplary embodiment, in the all-pixels-light-off period Toff, the analog driving circuits 35 of the plurality of pixel circuits 30 perform the analog current setting, and the threshold value compensation of the transistor TH2 causing the current value to flow.

According to the present exemplary embodiment, in the all-pixels-light-off period Toff, the threshold value compensation, together with the analog current setting, can be performed. In the present exemplary embodiment, since a display frame is simultaneously switched in all scanning lines, the analog current setting and the threshold value compensation can be performed simultaneously in all the scanning lines. Furthermore, since the all-pixels-light-off period Toff has a sufficient time for the analog data voltage writing and the threshold value compensation, a time for the analog data voltage writing and the threshold value compensation can be sufficiently ensured even in a high-definition display panel or the like.

7. Electronic Apparatus

Figure 23:
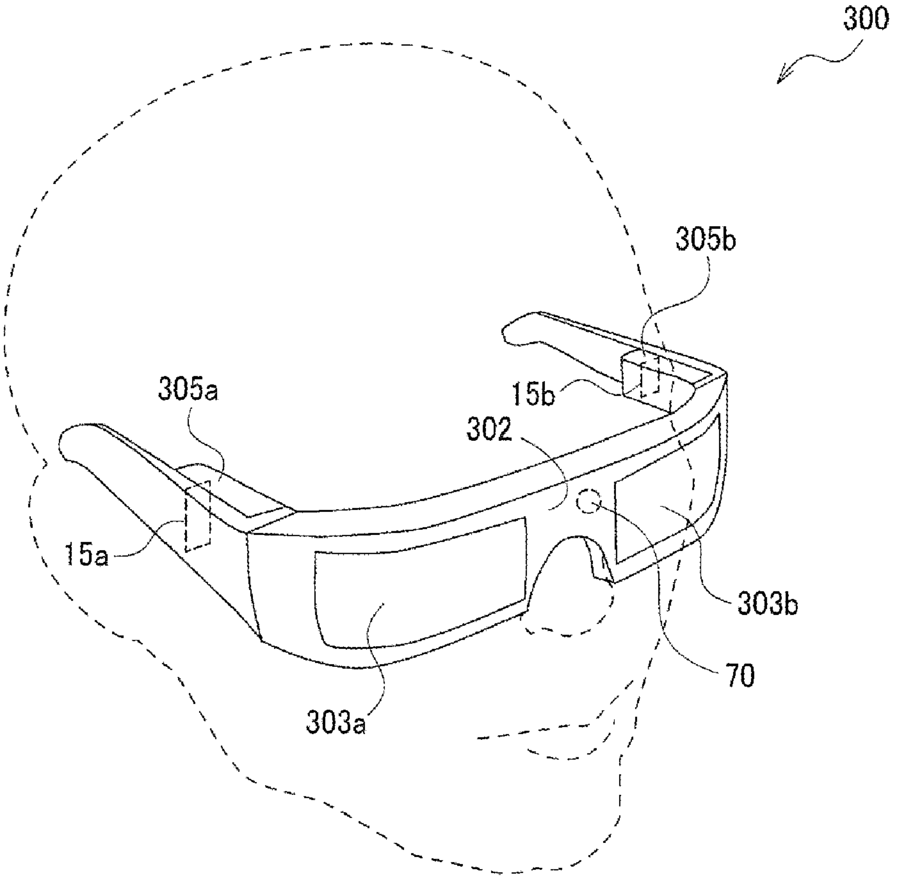
FIG. 23 is a configuration example of an electronic apparatus.

FIG. 23 illustrates a configuration example of an electronic apparatus 300 including electro-optical devices 15*a* and 15*b*. Each of the electro-optical devices 15*a* and 15*b* corresponds to the electro-optical device 15 in FIG. 2, FIG. 15, or FIG. 20. Here, description will be given using a case as an example in which the electronic apparatus is a head-mounted display, but the present disclosure is not limited thereto, and a variety of devices that display images each using an electro-optical device can be assumed as the electronic apparatus. For example, the electronic apparatus may be an electronic viewfinder, a projector, a head-up display, a personal digital assistant, a television device, an in-vehicle display, or the like.

The head-mounted display has an eyeglasses-like appearance and causes a user wearing the head-mounted display to visually recognize image light overlaid on external light. The electronic apparatus 300 as the head-mounted display includes a see-through members 303*a*, 303*b*, a frame 302, projection devices 305*a*, 305*b*, and the sensor 70.

The frame 302 supports the see-through members 303*a*, 303*b*, the projection devices 305*a*, and 305*b*. By the frame 302 mounted to the user's head, the head-mounted display is mounted to the user's head. The see-through member 303*a* is provided at a right eye portion of the frame 302, and the see-through member 303*b* is provided at a left eye portion of the frame 302. Since the see-through members 303*a* and 303*b* transmit the external light, the external light is visible to the user. The projection device 305*a* is provided at from a right temple portion to the right eye portion of the frame 302, and the projection device 305*b* is provided at from a left temple portion to the left eye portion of the frame 302. The projection devices 305*a* and 305*b* cause the image light to enter the eyes of the user, and thus the image light overlaid on the external light is visible to the user.

The projection device 305*a* includes the electro-optical device 15*a*. As described with FIG. 2, the electro-optical device 15*a* includes the circuit device 100 and the pixel array 20. The projection device 305*a* includes an optical system (not illustrated) that causes an image displayed on the pixel array 20 to be incident on the eyes of the user. The optical system includes, for example, a lens, and a light guide member that reflects the image light at an inner surface. Refraction by the lens, and curvature of a reflective surface of the light guide member are configured such that image light forms an image. Similarly, the projection device 305*b* includes the electro-optical device 15*b*, and an optical system (not illustrated).

The sensor 70 measures brightness information of environment. The sensor 70 is provided, for example, at a coupling portion coupling the right eye portion and the left eye portion of the frame 302. The sensor 70 is, for example, a photodiode, but an image sensor provided for photographing may also serve as the sensor 70. In this case, brightness information is acquired from an image imaged by the image sensor. Note that, when the electro-optical device 15 in FIG. 2 is adopted, the sensor 70 may be omitted.

The electro-optical device of the present exemplary embodiment described above includes the plurality of digital scanning lines, the digital signal line, and the plurality of pixel circuits. Each pixel circuit of the plurality of pixel circuits is coupled to a digital scanning line included in the plurality of digital scanning lines, and the digital signal line. Each pixel circuit includes the light-emitting element and the digital driving circuit. When the digital driving circuit is selected by the digital scanning line, display data is written to the digital driving circuit from the digital signal line, and the digital driving circuit performs digital driving that supplies a drive current to the light-emitting element in the on-period of a length corresponding to a gray scale value of the display data. A field that is a period in which one image is formed includes the all-pixels-light-off period in which the plurality of pixel circuits turn off the light-emitting elements, and the digital driving period in which the digital driving circuit performs the digital driving after the all-pixels-light-off period.

According to the present exemplary embodiment, an image is displayed in the electro-optical device in the digital driving period, and the all-pixels-light-off period is inserted between the digital driving period and the next digital driving period. In this way, an image display in a certain field and an image display in the next field are separated by the all-pixels-light-off period, and thus moving image blurring is reduced compared to the existing driving technique. Further, the field is a period in which one image is formed, and the one image in the field is displayed in the digital driving period. Thus, images of different fields are not mixed, and images of individual fields are temporally separated and displayed, so that moving image blurring is reduced compared to the existing driving technique.

In addition, in the present exemplary embodiment, each of the plurality of pixel circuits may perform the digital driving based on display data of an image displayed in a first field in the digital driving period of the first field. Each of the plurality of pixel circuits may perform the digital driving based on display data of an image displayed in a second field in the digital driving period of the second field.

According to the present exemplary embodiment, the digital driving in each field is performed based on display data of an image displayed in each field. Thus, images of respective fields are not mixed, and the image is displayed in the digital driving period of each field, so that moving image blurring is reduced compared to the existing driving technique.

In addition, in the present exemplary embodiment, the i-th pixel circuit among the first pixel circuit to the k-th pixel circuit as the plurality of pixel circuits, may be coupled to the i-th digital scanning line among the first digital scanning line to the k-th digital scanning line as the plurality of digital scanning lines. k is an integer equal to or greater than 2, and i is an integer from 1 to k. In the all-pixels-light-off period, the first digital scanning line to the k−1-th digital scanning line may be sequentially selected, and display data of an image displayed in a field may be written from the digital signal line to each of the first pixel circuit to the k−1-th pixel circuit. In the digital driving period, each of the first pixel circuit to the k−1-th pixel circuit may perform digital driving based on the display data written in the all-pixels-light-off period.

According to the present exemplary embodiment, the display data of the image displayed in the field can be written to the pixel circuit in the all-pixels-light-off period. Thus, in the digital driving period for the field, the digital driving is performed based on the display data of the image displayed in the field. Thus, images of respective fields are not mixed, and the image is displayed in a digital driving period of each field, so that moving image blurring is reduced compared to the existing driving technique.

In addition, in the present exemplary embodiment, the k-th digital scanning line may be selected in the first scanning line selection period of the digital driving period, and display data of an image displayed in a field may be written from the digital signal line to the k-th pixel circuit.

According to the present exemplary embodiment, the display data of the image displayed in the field is written to each of the first to k-th pixel circuits in the all-pixels-light-off period and the first scanning line selection period of the digital driving period. Thus, in the digital driving period for the field, the digital driving is performed based on the display data of the image displayed in the field.

Further, in the present exemplary embodiment, the electro-optical device may include a plurality of analog scanning lines and an analog signal line. Each pixel circuit may be coupled to an analog scanning line included in the plurality of analog scanning lines, and the analog signal line. Each pixel circuit may include an analog driving circuit. When the analog driving circuit is selected by the analog scanning line, an analog data voltage is written to the analog driving circuit from the analog signal line, and analog current setting for variably setting a current value of a drive current may be performed based on the analog data voltage.

According to the present exemplary embodiment, the analog driving circuit adjusts the drive current variably, and the digital driving circuit performs the digital driving of the light-emitting element by the drive current. As a result, emission brightness when the light-emitting element is on is adjusted, and thus all gray scales can be used even in a dark environment, and both the adjustment of display brightness in accordance with brightness of environment, and good gray scale display can be achieved.

In addition, in the present exemplary embodiment, the analog driving circuits of the plurality of pixel circuits may perform the analog current setting in the all-pixels-light-off period.

According to the present exemplary embodiment, since a display frame is simultaneously switched in all the scanning lines, the analog current setting can be performed simultaneously in all the scanning lines. Furthermore, since the all-pixels-light-off period has a sufficient time for analog data voltage writing, a time for the analog data voltage writing can be sufficiently ensured even in a high-definition display panel or the like.

In addition, in the present exemplary embodiment, the analog driving circuits of the plurality of pixel circuits may perform the analog current setting, and the threshold value compensation of a transistor causing a current value to flow, in the all-pixels-light-off period.

According to the present exemplary embodiment, since a display frame is simultaneously switched in all the scanning lines, the analog current setting and the threshold value compensation can be performed simultaneously in all the scanning lines. Furthermore, since the all-pixels-light-off period has a sufficient time for the analog data voltage writing and the threshold value compensation, a time for the analog data voltage writing and the threshold value compensation can be sufficiently ensured even in a high-definition display panel or the like.

Further, in the present exemplary embodiment, a field may be configured with the all-pixels-light-off period and the digital driving period after the all-pixels-light-off period.

According to the present exemplary embodiment, the field includes the all-pixels-light-off period, and the digital driving period for displaying one image by the digital driving. Accordingly, one image is displayed in the digital driving period for a certain field, the all-pixels-light-off period for the next frame follows, and subsequently one image is displayed in the digital driving period. Thus, images of different fields are not mixed, and images of individual fields are temporally separated and displayed, so that moving image blurring is reduced compared to the existing driving technique.

In the present exemplary embodiment, the digital driving period of a field may include a plurality of sub-fields. In a sub-field included in the plurality of sub-fields, the scanning line driving circuit may select, once, one scanning line group to be selected from the plurality of digital scanning lines.

According to the present exemplary embodiment, a scanning line group to be selected in each sub-field is selected. Accordingly, it is possible to reduce a non-scanning period in which no scanning line is selected, and a scanning line drive frequency can be reduced as compared to the technique of JP 2019-132941 A and JP 2008-281827 A.

In addition, in the present exemplary embodiment, each sub-field of a plurality of sub-fields may be a period of the same length.

The fact that each sub-field is the period of the same length is that the number of scanning lines in a scanning line group selected in each sub-field is the same. Then, the same number of scanning lines as that of bits of display data are shifted per sub-field and selected, and when one cycle is completed, the first to n-th bits are written to all the scanning lines in one frame.

Further, in the present exemplary embodiment, the electro-optical device may include a scanning line driving circuit that drives a plurality of digital scanning lines. The digital driving period may include a first scanning line selection period to an n-th scanning line selection period in which first to n-th bits of display data are written to the pixel circuit, respectively, and a first display period to an n-th display period in which the light-emitting element is on or off by the first to n-th bits written to the pixel circuit. n is an integer equal to or greater than 2. The on-period may be a display period in which the light-emitting element is on among the first display period to the n-th display period.

According to the present exemplary embodiment, in the digital driving period, the light-emitting element emits light in the on-period of a length corresponding to a gray scale value of display data. Time-averaged emission brightness in one frame is determined by a ratio of the on-period to one frame, thus is brightness in proportion to a gray scale value based on maximum brightness.

In addition, in the present exemplary embodiment, a scanning line group may include a digital scanning line coupled to a pixel circuit to which an i-th bit among a first bit to an n-th bit of display data is written in a sub-field, and a digital scanning line coupled to a pixel circuit to which a j-th bit among the first bit to the n-th bit of the display data is written in the sub-field. i is an integer from 1 to n, and j is an integer from 1 to n and different from i.

According to the present exemplary embodiment, the i-th bit is written to one scanning line in one sub-field, and the j-th bit is written to a different scanning line. Accordingly, it is possible to reduce a non-scanning period in which no scanning line is selected, and a scanning line drive frequency can be reduced as compared to the technique of JP 2019-132941 A and JP 2008-281827 A.

In the present exemplary embodiment, a length of a first display period may be a times a length of a sub-field. a is an integer equal to or greater than 1. The number of scanning line selections in the digital driving period may be Ndd, the number of bits of display data may be n, and a length of a light-off period in the digital driving period may be b times the length of the sub-field. n is an integer equal to or greater than 2, and b is an integer equal to or greater than 0. At this time, $Ndd=((2^n-1)\times a+1)\times n+b\times n$ may hold.

According to the present exemplary embodiment, in a range where k, which is the number of the scanning lines, can be an integer, n, which is the number of bits of display data, the multiple a indicating a length of the display period for a first bit, and the parameter b indicating the length of the light-off period in the digital driving period can be freely adjusted. Accordingly, it is possible to support display panels having various numbers of pixels.

Further, in the present exemplary embodiment, the number of scanning line selections in a field may be Nfr, and the number of a plurality of digital scanning lines may be k. k is an integer equal to or greater than 2. At this time, $Nfr \geq Ndd+k-1$ may hold.

According to the present exemplary embodiment, a length of the all-pixels-light-off period is equal to or greater than (k−1)h. Thus, in the all-pixels-light-off period, to the digital driving circuit of the pixel of each of first to k-th scanning lines, image data of an image displayed in a frame can be written. Accordingly, images in respective fields are not mixed, and are displayed in digital driving periods for respective fields.

Further, in the electronic apparatus of the present exemplary embodiment includes the electro-optical device described in any one of the above.

Further, the driving method of the present exemplary embodiment is the method of driving the electro-optical device including the plurality of digital scanning lines, the digital signal line, and the plurality of pixel circuits. The driving method includes turning off the light-emitting element included in each pixel circuit of the plurality of pixel circuits, in the all-pixels-light-off period included in a field that is a period in which one image is formed. The driving method includes performing the digital driving by each pixel circuit in the digital driving period that is included in a field and that is after the all-pixels-light-off period. The driving method includes, in the digital driving, supplying, by each pixel circuit to which display data is written from the digital signal line when selected by the digital scanning line, a drive current to the light-emitting element in the on-period of a length corresponding to a gray scale value of display data.

Note that, although the present exemplary embodiment has been described in detail above, those skilled in the art will easily understand that many modified examples can be made without substantially departing from novel items and effects of the present disclosure. All such modified examples are thus included in the scope of the disclosure. For example, terms in the descriptions or drawings given even once along with different terms having identical or broader meanings can be replaced with those different terms in all parts of the descriptions or drawings. All combinations of the embodiment and modified examples are also included within the scope of the disclosure. Furthermore, the configurations, operations, and the like of the circuit device, the pixel array, the display controller, the display system, the sensor, the electro-optical device, the electronic apparatus, and the like are not limited to those described in the present exemplary embodiment, and various modifications thereof are possible.

What is claimed is:

1. An electro-optical device, comprising:

a plurality of digital scanning lines;

a digital signal line; and a plurality of pixel circuits that are each coupled to a digital scanning line included in the plurality of digital scanning lines, and the digital signal line, wherein each of the pixel circuits includes a light-emitting element, and a digital driving circuit that performs digital driving, the digital driving in which, when the pixel circuit is selected by the digital scanning line, display data is written to selected pixel circuit from the digital signal line, and a drive current is supplied to the light-emitting element of selected pixel circuit in an on-period of a length corresponding to a gray scale value of the display data, and a field that is a period in which one image is formed includes an all-pixels-light-off period in which the plurality of pixel circuits turn off the light-emitting element, and a digital driving period in which the digital driving circuit performs the digital driving after the all-pixels-light-off period, and wherein an i-th pixel circuit among a first pixel circuit to a k-th pixel circuit that are the plurality of pixel circuits is coupled to an i-th digital scanning line among a first digital scanning line to a k-th digital scanning line that are the plurality of digital scanning lines, k being an integer equal to or greater than 2, i being an integer from 1 to k, in the all-pixels-light-off period, the first digital scanning line to the k−1-th digital scanning line are sequentially selected, the display data of the image displayed in the field is written to the first pixel circuit to the k−1-th pixel circuit from the digital signal line, and in the digital driving period, the first pixel circuit to the k−1-th pixel circuit perform the digital driving based on the display data written in the all-pixels-light-off period.

2. The electro-optical device according to claim 1, wherein the plurality of pixel circuits perform, in the digital driving period for a first field, the digital driving based on display data of an image displayed in the first field, and perform, in the digital driving period for a second field, the digital driving based on display data of an image displayed in the second field.

3. The electro-optical device according to claim 1, wherein in a first scanning line selection period of the digital driving period, the k-th digital scanning line is selected, and the display data of the image displayed in the field is written to the k-th pixel circuit from the digital signal line.

4. The electro-optical device according to claim 1, comprising:

a plurality of analog scanning lines; and an analog signal line, wherein each of the pixel circuits is coupled to an analog scanning line included in the plurality of analog scanning lines, and the analog signal line, and each of the pixel circuits includes an analog driving circuit to which an analog data voltage is written from the analog signal line when selected by the analog scanning line and that performs analog current setting for variably setting a current value of the drive current based on the analog data voltage.

5. The electro-optical device according to claim 4, wherein in the all-pixels-light-off period, the analog driving circuit of the plurality of pixel circuits performs the analog current setting.

6. The electro-optical device according to claim 5, wherein in the all-pixels-light-off period, the analog driving circuit of the plurality of pixel circuits performs the analog current setting and performs threshold value compensation for a transistor that causes the current value to flow.

7. The electro-optical device according to claim 1, wherein the field includes the all-pixels-light-off period, and the digital driving period after the all-pixels-light-off period.

8. The electro-optical device according to claim 1, wherein the digital driving period for the field includes a plurality of sub-fields, and a scanning line driving circuit selects, once, a scanning line group to be selected among the plurality of digital scanning lines, in a sub-field included in the plurality of sub-fields.

9. The electro-optical device according to claim 8, wherein each sub-field of the plurality of sub-fields is a period of the same length.

10. The electro-optical device according to claim 8, comprising:

a scanning line driving circuit configured to drive the plurality of digital scanning lines, wherein the digital driving period includes a first scanning line selection period to an n-th scanning line selection period in which a first bit to an n-th bit of the display data are written to a pixel circuit, n being an integer equal to or greater than 2, and a first display period to an n-th display period in which the light-emitting element is on or off by the first bit to the n-th bit written to the pixel circuit, and the on-period is a display period among the first display period to the n-th display period, in which the light-emitting element is on.

11. The electro-optical device according to claim 10, wherein the scanning line group includes a digital scanning line coupled to a pixel circuit to which an i-th bit is written, in the sub-field, among the first bit to the n-th bit of the display data, i being an integer from 1 to n, and a digital scanning line coupled to a pixel circuit to which a j-th bit is written, in the sub-field, among the first bit to the n-th bit of the display data, j being an integer from 1 to n and different from i.

12. The electro-optical device according to claim 10, wherein a length of the first display period is a times a length of the sub-field, a being an integer equal to or greater than 1, and $Ndd=((2^n-1)\times a+1)\times n+b\times n$, where Ndd is the number of scanning line selections in the digital driving period, n is the number of bits of the display data, n being an integer equal to or greater than 2, and a length of a light-off period in the digital driving period is b times a length of the sub-field, b being an integer equal to or greater than 0.

13. The electro-optical device according to claim 12, wherein $Nfr\geq Ndd+k-1$, where Nfr is the number of scanning line selections in the field, and k is the number of the plurality of digital scanning lines, k being an integer equal to or greater than 2.

14. An electronic apparatus comprising the electro-optical device according to claim 1.

15. A driving method for driving an electro-optical device including a plurality of digital scanning lines, a digital signal line, and a plurality of pixel circuits, the driving method comprising:

turning off a light-emitting element included in each pixel circuit of the plurality of pixel circuits in an all-pixels-light-off period included in a field that is a period in which one image is formed;

performing digital driving by each of the pixel circuits in a digital driving period that is included in the field and is after the all-pixels-light-off period; and supplying, in the digital driving, by each of the pixel circuits to which display data is written from the digital signal line when selected by the digital scanning line, a drive current to the light-emitting element in an on-period of a length corresponding to a gray scale value of the display data, wherein an i-th pixel circuit among a first pixel circuit to a k-th pixel circuit that are the plurality of pixel circuits is coupled to an i-th digital scanning line among a first digital scanning line to a k-th digital scanning line that are the plurality of digital scanning lines, k being an integer equal to or greater than 2, i being an integer from 1 to k, in the all-pixels-light-off period, the first digital scanning line to the k−1-th digital scanning line are sequentially selected, the display data of the image displayed in the field is written to the first pixel circuit to the k−1-th pixel circuit from the digital signal line, and in the digital driving period, the first pixel circuit to the k−1-th pixel circuit perform the digital driving based on the display data written in the all-pixels-light-off period.

16. An electro-optical device, comprising:

a plurality of digital scanning lines;

a digital signal line;

a plurality of pixel circuits that are each coupled to a digital scanning line included in the plurality of digital scanning lines, and the digital signal line;

a plurality of analog scanning lines; and an analog signal line, wherein each of the pixel circuits includes a light-emitting element; and a digital driving circuit that performs digital driving, the digital driving in which, when the pixel circuit is selected by the digital scanning line, display data is written to selected pixel circuit from the digital signal line, and a drive current is supplied to the light-emitting element of selected pixel circuit in an on-period of a length corresponding to a gray scale value of the display data, and a field that is a period in which one image is formed includes an all-pixels-light-off period in which the plurality of pixel circuits turn off the light-emitting element, and a digital driving period in which the digital driving circuit performs the digital driving after the all-pixels-light-off period, each of the pixel circuits is coupled to an analog scanning line included in the plurality of analog scanning lines, and the analog signal line, each of the pixel circuits includes an analog driving circuit to which an analog data voltage is written from the analog signal line when selected by the analog scanning line and that performs analog current setting for variably setting a current value of the drive current based on the analog data voltage, and in the all-pixels-light-off period, the analog driving circuit of the plurality of pixel circuits performs the analog current setting.

* * * * *